United States Patent
Atkinson et al.

(10) Patent No.: US 10,889,210 B2
(45) Date of Patent: Jan. 12, 2021

(54) APPARATUS FOR A VEHICLE AND A VEHICLE

(71) Applicant: JAGUAR LAND ROVER LIMITED, Warwickshire (GB)

(72) Inventors: Matthew Atkinson, Coventry (GB); Paul Kellitt, Coventry (GB); Jessica Bunyan, Coventry (GB); Eleanor Tran, Coventry (GB); Emily Greenhalgh, Coventry (GB); Matthew Oakley, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 1 day.

(21) Appl. No.: 16/207,757

(22) Filed: Dec. 3, 2018

(65) Prior Publication Data
US 2019/0176661 A1    Jun. 13, 2019

(30) Foreign Application Priority Data
Dec. 7, 2017  (GB) .................................. 1720395.1

(51) Int. Cl.
*B60N 2/22* (2006.01)
*B60N 2/24* (2006.01)
(Continued)

(52) U.S. Cl.
CPC .............. *B60N 2/24* (2013.01); *B60N 2/206* (2013.01); *B60N 2/22* (2013.01); *B60N 2/36* (2013.01); *B60N 2/646* (2013.01)

(58) Field of Classification Search
CPC . B60N 2/206; B60N 2/22; B60N 2/24; B60N 2/646; B60N 2/30; B60N 2/3072;
(Continued)

(56) References Cited

U.S. PATENT DOCUMENTS 2,702,076 A    2/1955  Beardsley et al.
3,151,906 A *  10/1964  Roberts ................ B60N 2/3047
                                                          296/66
(Continued)

FOREIGN PATENT DOCUMENTS

DE    18 54 697 U    7/1962
EP    2 957 457 A1   12/2015
(Continued)

OTHER PUBLICATIONS

Combined Search and Examination Report under Sections 17 and 18(3) for Application No. GB1720395.1 dated Apr. 27, 2018.
(Continued)

*Primary Examiner* — Gregory A Blankenship
(74) *Attorney, Agent, or Firm* — Carlson, Gaskey & Olds

(57) ABSTRACT

An apparatus for a vehicle comprises a lid for covering an opening of a container and a panel pivotally attached to the lid to enable the panel to pivot between a stowed orientation, in which the panel extends alongside the first face of the lid, and a first deployed orientation, in which the panel extends at a positive angle to the first face of the lid. The apparatus also includes a cushion member and a cushion attachment mechanism attaching the cushion member to the lid. The cushion attachment mechanism is arranged to enable the cushion member to move between a stowed position and a deployed position.

20 Claims, 15 Drawing Sheets

(51) Int. Cl.
  *B60N 2/20* (2006.01)
  *B60N 2/64* (2006.01)
  *B60N 2/26* (2006.01)
  *B60N 2/36* (2006.01)
(58) Field of Classification Search
  CPC .. B60N 2/3075; B60N 2/3077; B60N 2/3079; B60N 2/36
  USPC ............ 297/15; 296/37.08, 37.14, 69, 65.06, 296/65.09
  See application file for complete search history.

(56) References Cited

U.S. PATENT DOCUMENTS

| | | | | |
|---|---|---|---|---|
| 3,202,453 | A * | 8/1965 | Richards | B60N 2/3079 296/66 |
| 5,482,346 | A * | 1/1996 | Lesourd | B60N 2/3013 296/66 |
| 6,588,822 | B1 | 7/2003 | Duvall, Jr. | |
| 7,354,090 | B1 * | 4/2008 | Pomorski | B60N 2/005 296/26.11 |
| 2006/0091705 | A1 * | 5/2006 | White | B60N 2/01525 297/6 |
| 2008/0030039 | A1 * | 2/2008 | Sturt | B60N 2/3079 296/63 |
| 2009/0108639 | A1 * | 4/2009 | Sturt | B60N 2/22 297/15 |
| 2012/0007392 | A1 * | 1/2012 | Daniels, Jr. | B60N 2/24 297/188.14 |
| 2014/0265418 | A1 * | 9/2014 | Thota | B60N 2/206 296/65.16 |
| 2014/0333086 | A1 * | 11/2014 | Zalan | B60N 2/856 296/65.05 |
| 2016/0229317 | A1 * | 8/2016 | Janally | B60N 2/3095 |
| 2018/0099589 | A1 * | 4/2018 | Murray | B60N 2/015 |
| 2019/0176661 | A1 * | 6/2019 | Atkinson | B60N 2/3095 |

FOREIGN PATENT DOCUMENTS

| | | |
|---|---|---|
| JP | 2006-219017 A | 8/2006 |
| WO | 2014/147414 A1 | 9/2014 |

OTHER PUBLICATIONS

Search Report for German Application No. 10-2018-220-638.4, dated Jun. 3, 2020.

* cited by examiner

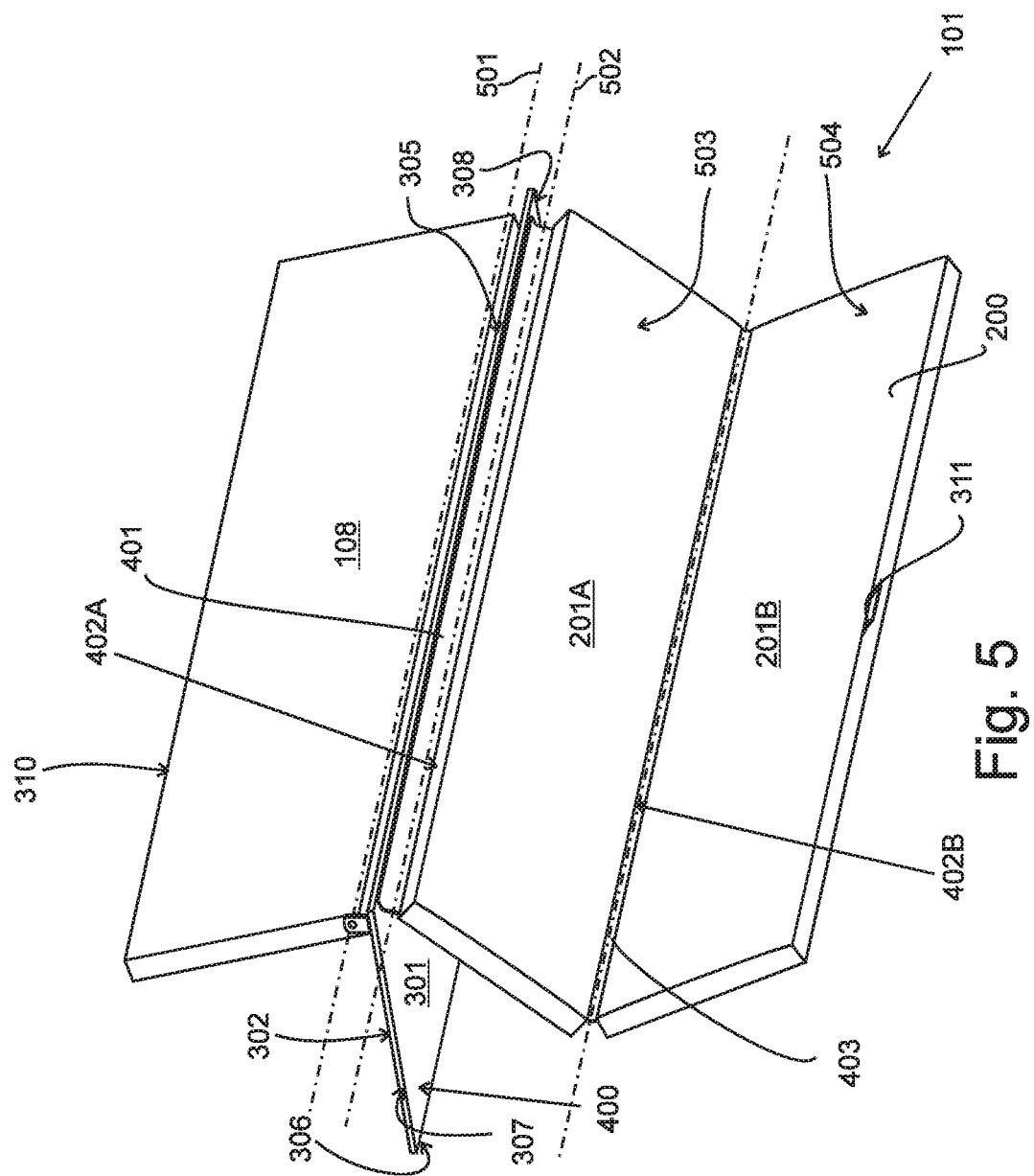

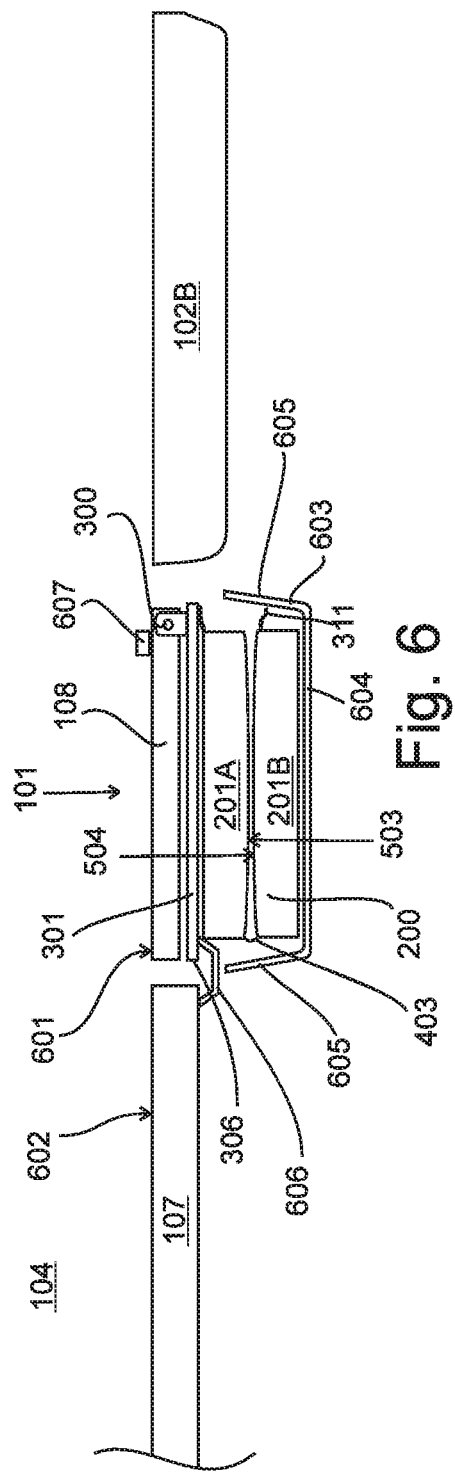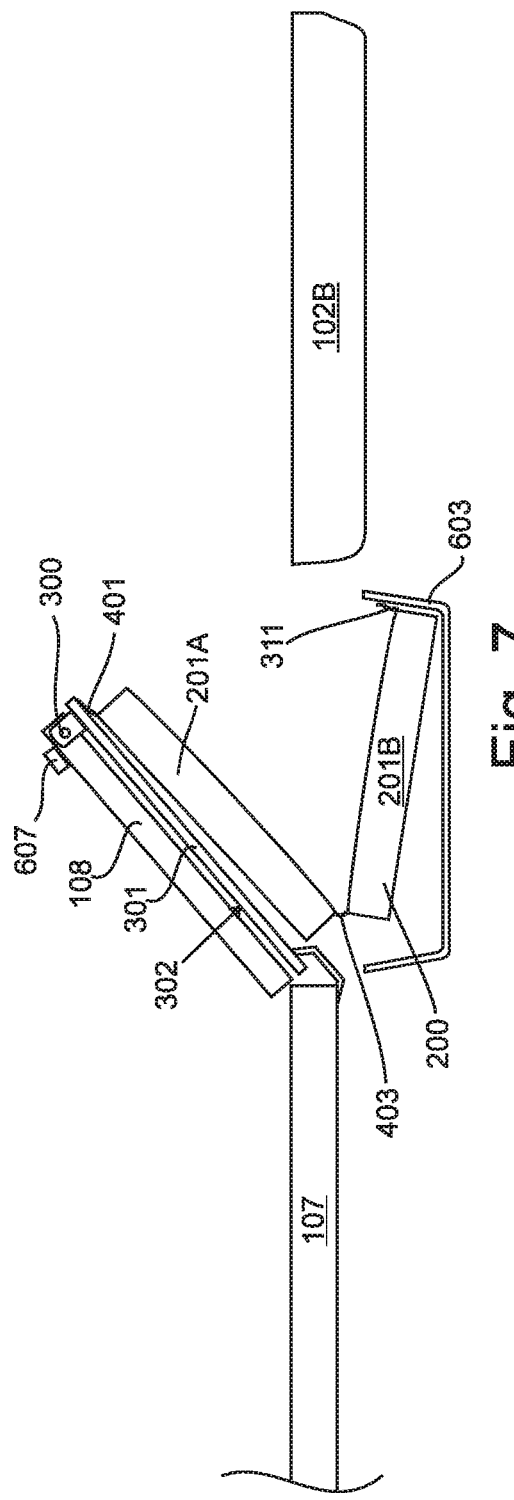

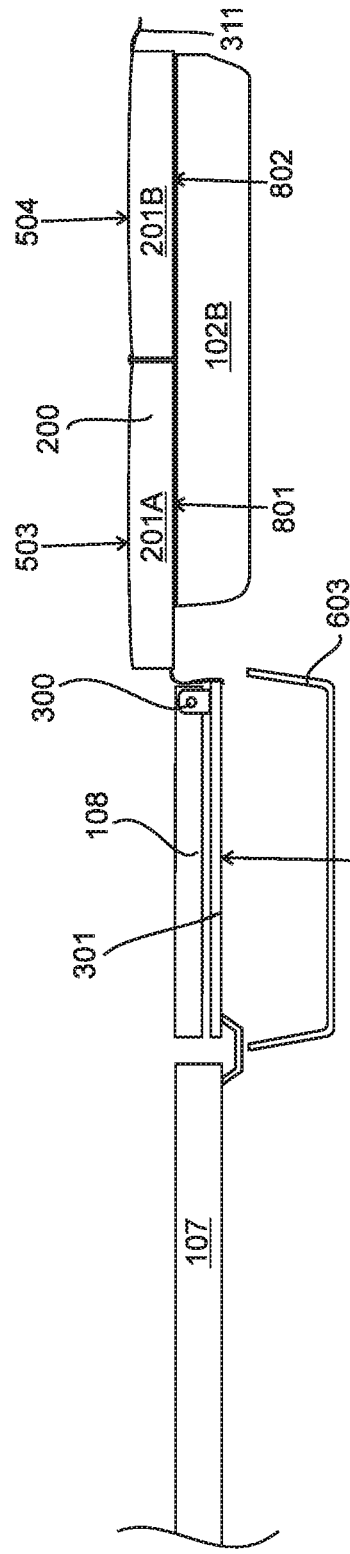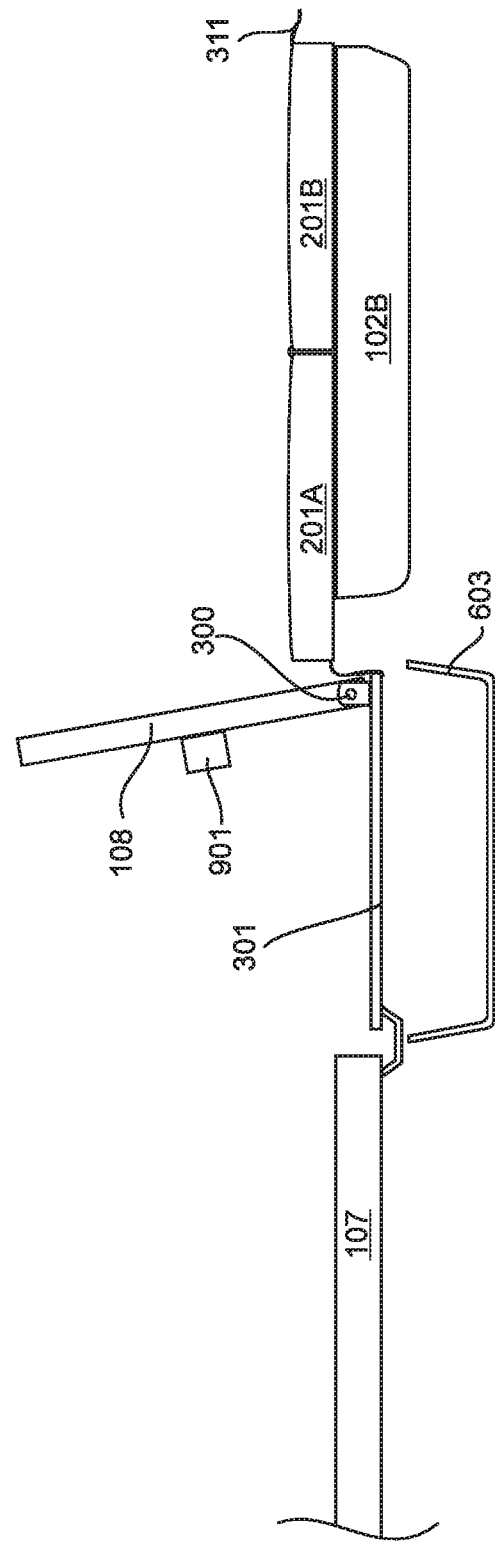

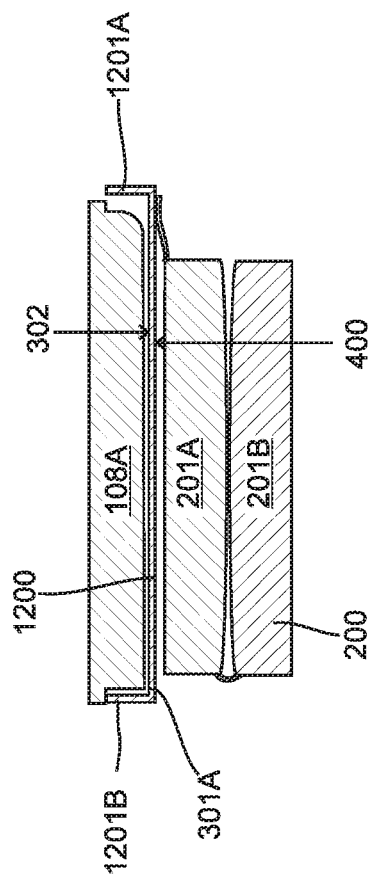
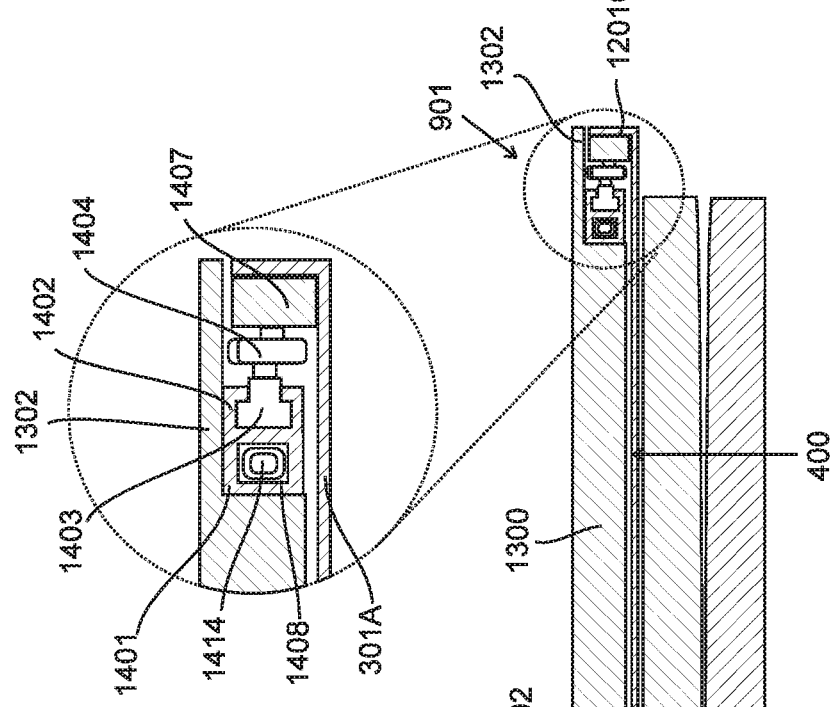

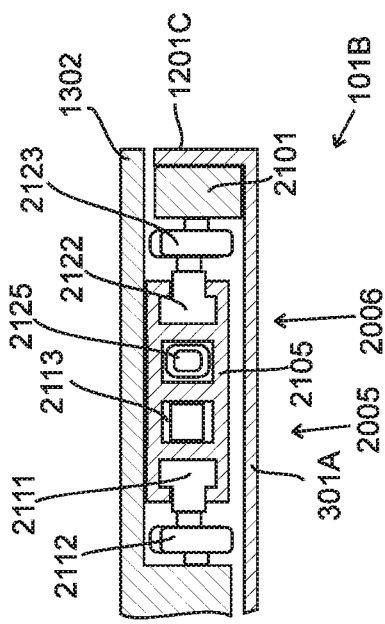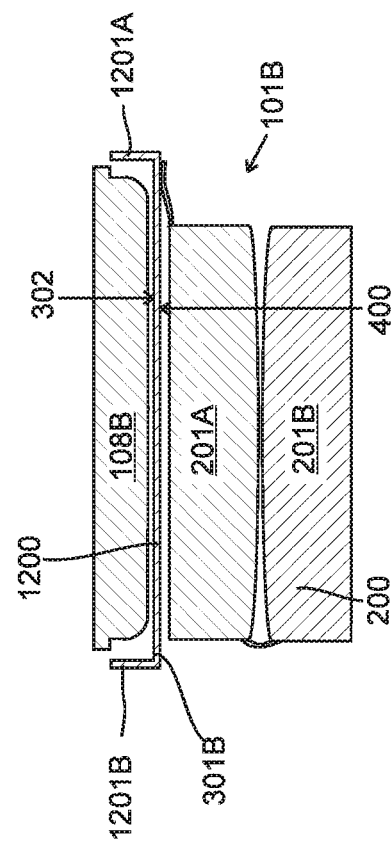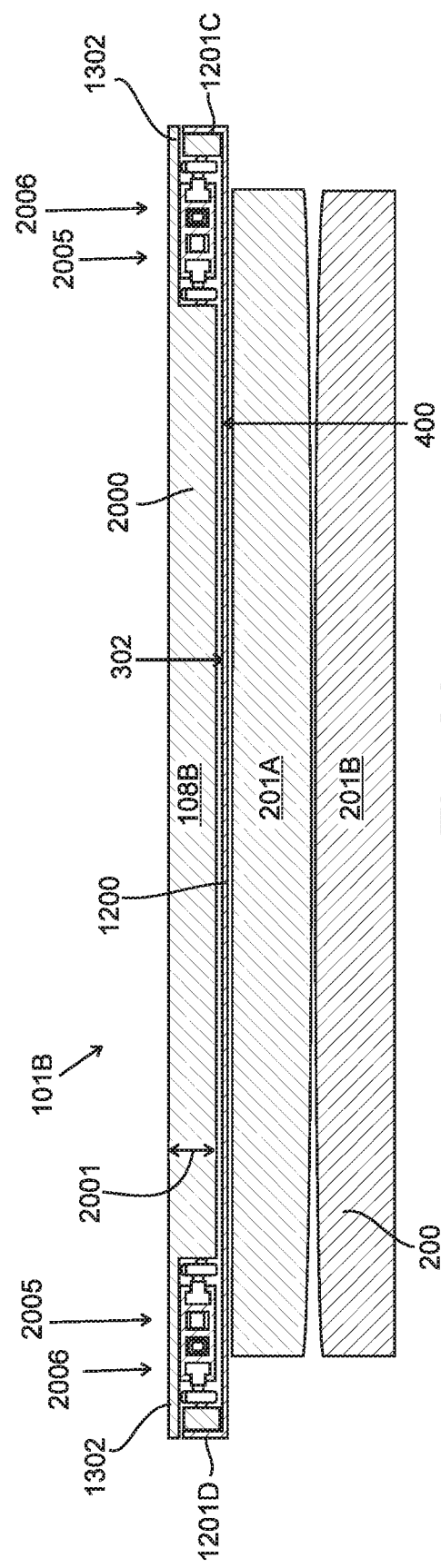

APPARATUS FOR A VEHICLE AND A VEHICLE

CROSS REFERENCE TO RELATED APPLICATIONS

This application claims priority to United Kingdom Patent Application No. GB 1720395.1, filed on 7 Dec. 2017.

TECHNICAL FIELD

The present disclosure relates to an apparatus for a vehicle and a vehicle. In particular, but not exclusively it relates to an apparatus for a road vehicle and a road vehicle including such an apparatus.

Aspects of the invention relate to an apparatus and a vehicle.

BACKGROUND

In vehicles with a split tailgate, users of the vehicle often open the tailgate and sit on the lower portion of the tailgate. However, the tailgate does not provide the most comfortable of surfaces to sit upon nor does it provide any back support for the user.

It is an aim of the present invention to address disadvantages of the prior art.

SUMMARY OF THE INVENTION

Aspects and embodiments of the invention provide an apparatus and a vehicle as claimed in the appended claims.

According to an aspect of the invention there is provided an apparatus for a vehicle comprising: a lid for covering an opening of a container, the lid having a first face facing in a first direction; a panel pivotally attached to the lid to enable the panel to pivot between a stowed orientation, in which the panel extends alongside the first face of the lid, and a first deployed orientation, in which the panel extends at a positive angle to the first face of the lid; a cushion member; and a cushion attachment means attaching the cushion member to the lid, wherein the cushion attachment means is arranged to enable the cushion member to move between a stowed position and a deployed position.

According to a further aspect of the invention there is provided an apparatus for a vehicle comprising: a lid for covering an opening of a container, the lid having a first face facing in a first direction; a panel pivotally attached to the lid to enable the panel to pivot between a stowed orientation, in which the panel extends alongside the first face of the lid, and a first deployed orientation, in which the panel extends at a positive angle to the first face of the lid; a cushion member; and a cushion attachment mechanism attaching the cushion member to the lid, wherein the cushion attachment mechanism is arranged to enable the cushion member to move between a stowed position and a deployed position.

This provides the advantage that the apparatus may be stowed in a vehicle and deployed to provide a cushioned area upon which a user of the vehicle may sit with the panel providing a backrest. More specifically, once deployed, the panel provides an inclined surface relative to the first face of the lid that is suitable for use as a backrest.

In some embodiments the lid has a second face facing in a second direction opposite to the first direction and the cushion attachment mechanism is arranged to enable the cushion member to move between the stowed position in which the cushion member resides alongside the second face of the lid and the deployed position in which the cushion member extends away from the lid substantially parallel to the second face. This provides the advantage that the lid may be used to cover a container containing the cushion member in its stowed position and the cushion member may be moved to its deployed position outside of the container to provide a cushioned area upon which a user of the vehicle may sit.

In some embodiments the panel is arranged to pivot about a first axis relative to the lid, the cushion attachment mechanism is arranged to enable the cushion member to pivot about a second axis relative to the lid, and the second axis is parallel to the first axis. This provides the advantage that the cushion member and the panel may be pivoted to their deployed positions, so that the panel is positioned to provide a backrest for a user sitting on the cushion member.

In some embodiments the first face of the lid has a first side, and the first axis and the second axis are adjacent to the first side. This provides the advantage that when the panel has been returned to its stowed orientation, the cushion member may be stowed in a container below the lid by pivoting the lid about an axis adjacent to its first side.

In some embodiments the lid is in the form of a tray having a side wall along a first side and along a second side thereof; and the panel resides at least partially within the tray in the stowed orientation.

In some embodiments the cushion member comprises a first portion attached to the lid by the cushion attachment mechanism and a second portion attached to the first portion by a folding mechanism, the folding mechanism being arranged to enable the second portion to pivot with respect to the first portion. This provides the advantage that the first portion and the second portion of the cushion member may be deployed from a folded configuration by pulling the second portion.

In some embodiments the folding mechanism enables the second portion to pivot between a folded configuration in which a face of the second portion rests against a face of the first portion and an unfolded configuration in which the first portion and the second portion are able to rest against a supporting surface with said face of the second portion and said face of the first portion facing away from the supporting surface. This provides the advantage that the cushion member may be stowed in a compartment that would otherwise be too small.

In some embodiments the folding mechanism comprises flexible material configured to flex to enable the second portion to pivot with respect to the first portion.

In some embodiments the apparatus comprises a retaining mechanism for maintaining the panel at the positive angle to the first face. This provides the advantage that a separate retaining mechanism does not have to be provided.

In some embodiments the retaining mechanism comprises a latch moveable between a latched position, in which the retaining mechanism is arranged to maintain the positive angle between the panel and the first face of the lid, and a unlatched position, in which the retaining mechanism allows the panel to be moved to the stowed orientation.

In some embodiments the retaining mechanism comprises a strut having a first end pivotally attached to a carriage arranged to slide along a track; a second end of the strut is pivotally attached to a first one of the panel and the lid; and the track is attached to the other one of the panel and the lid. This provides the advantage that the retaining mechanism may be sufficiently strong while being easily deployed.

In some embodiments in the latched position the latch is configured to provide a reactive force to the carriage to prevent movement of the carriage.

In some embodiments the panel is pivotally attached to the lid by a first pivot mechanism to enable the panel to pivot about a first axis to the first deployed orientation; and the apparatus comprises a second pivot mechanism to enable the panel to pivot with respect to the lid about an alternative pivot axis, instead of the first axis, to a second deployed orientation. This provides the advantage that when the apparatus is installed in a loadspace of a vehicle the panel may be raised from a horizontal stowed orientation to a non-horizontal orientation at to different positions. For example, it may be raised to provide a backrest at a first position and raised to provide a partition for the loadspace at a different position.

In some embodiments the first pivot mechanism comprises a first pivot pin and the second pivot mechanism comprises a second pivot pin.

In some embodiments the apparatus comprises a second retaining mechanism configured to retain the panel in the second deployed orientation. This provides the advantage that a separate retaining mechanism does not have to be provided to maintain the panel in its second deployed orientation.

In some embodiments the second retaining mechanism comprises a second latch moveable between a second latched position, in which the second retaining mechanism is arranged to retain the panel in the second deployed orientation, and a second unlatched position, in which the second retaining mechanism allows the panel to be moved to the stowed orientation.

In some embodiments the second retaining mechanism comprises a second strut having a first end pivotally attached to a second carriage arranged to slide along a second track; a second end of the second strut is pivotally attached to a first one of the panel and the lid; and the second track is attached to the other one of the panel and the lid. This provides the advantage that the second retaining mechanism may be sufficiently strong while being easily deployed.

In some embodiments the apparatus comprises a hinge mechanism attached to the lid, the hinge mechanism being configured to enable the lid to be pivoted about the hinge mechanism.

In some embodiments the first face of the lid has a first side and a second side opposite to the first side; the panel is arranged to pivot relative to the lid about a first axis adjacent to said first side; and the hinge mechanism is configured to enable the lid to pivot about a hinge axis adjacent to said second side. This provides the advantage that the cushion member may be deployed by opening the lid by pivoting about the hinge mechanism, pulling forwards the cushion member away from the lid, closing the lid and then forming a backrest adjacent to the cushion member by pivoting the panel upwards.

In some embodiments the apparatus comprises a container having an opening; the lid is arranged to cover the opening of the container; the stowed position of the cushion member is within the container; and the deployed position is outside of the container.

In some embodiments the hinge mechanism comprises at least one hinge.

In some embodiments the cushion attachment mechanism comprises flexible material configured to flex to enable the cushion member to pivot between the stowed position and the deployed position. This provides the advantage that the cushion attachment mechanism has a simple structure but enables relatively complex movement of the cushion member relative to the lid. For example, it allows the cushion member to be translated as well as rotated during its movement between the stowed position and the deployed position.

According to another aspect of the invention there is provided a vehicle comprising the apparatus of any one of the previous paragraphs. This provides the advantage that the apparatus may be used to provide a temporary area to sit upon within the vehicle.

In some embodiments in the stowed orientation the panel forms a floor panel within a loadspace of the vehicle. This provides the advantage that the apparatus may be arranged to be located below floor level rather than taking up space within the loadspace itself.

In some embodiments the vehicle has a tailgate enabling access to the loadspace. This provides the advantage that the apparatus may be positioned so that, when the tailgate is open, a user may sit on the deployed cushion member with a lower part of their legs over the rear end of the vehicle.

In some embodiments the vehicle has a split tailgate. This provides the advantage that the apparatus may be positioned so that, when the tailgate is open, the cushion member may be deployed to cover the lower portion of tailgate.

In some embodiments the split tailgate has a lower portion pivotable about a laterally extending axis, and in the deployed position the cushion member extends over the lower portion. This provides the advantage that a user may sit on the deployed cushion member with a lower part of their legs hanging over the end of the lower portion of the tailgate.

In some embodiments in the first deployed orientation the panel provides a backrest for a person.

In some embodiments in the second deployed orientation the panel provides a partition for the loadspace in the vehicle. This provides the advantage that the panel may be used to prevent movement of items sliding around the loadspace during movement of the vehicle.

According to a further aspect of the invention there is provided a vehicle comprising a loadspace and an apparatus, the apparatus comprising: a container having an opening at an upper end; a lid closeable to cover the opening of the container and openable to provide access into the container; a panel pivotally attached to the lid to enable the panel to pivot between a stowed orientation, in which the panel extends alongside the lid to provide a floor panel of the loadspace of the vehicle, and a first deployed orientation, in which the panel extends at a positive angle to the lid; and a cushion member within the container and moveable to a deployed position outside of the container.

According to yet another aspect of the invention there is provided a vehicle comprising a loadspace and an apparatus for providing a sitting area for a person, the apparatus comprising: a floor panel providing at least a part of a floor of the loadspace of the vehicle; a container located below the floor panel; a cushion member within the container and moveable to a deployed position outside of the container; wherein the panel is pivotally moveable to enable access into the container and pivotally moveable to a deployed orientation in which the panel provides a backrest with the cushion member in the deployed position.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 5 shows a view of the apparatus from the side and below with a panel of the apparatus in a deployed orientation and its cushion member partially unfolded;

FIG. 6 shows the apparatus with its cushion member and panel in their stowed positions;

FIG. 7 shows the apparatus with its lid in a raised orientation;

FIG. 8 shows the apparatus with the cushion member its deployed position;

FIG. 9 shows the apparatus with the panel its deployed position;

FIG. 12 shows a cross-sectional side view of the apparatus of FIG. 10;

FIG. 13 shows a cross-sectional front view of the apparatus of FIG. 10;

FIG. 19 shows a cross-sectional side view of the apparatus of FIG. 16, with its panel in a stowed orientation;

FIG. 20 shows a cross-sectional front view of the apparatus of FIG. 16, with its panel in a stowed orientation;

FIG. 20A shows an enlarged cross-sectional view of an end portion of the apparatus of FIG. 16;

DETAILED DESCRIPTION

Figure 1:
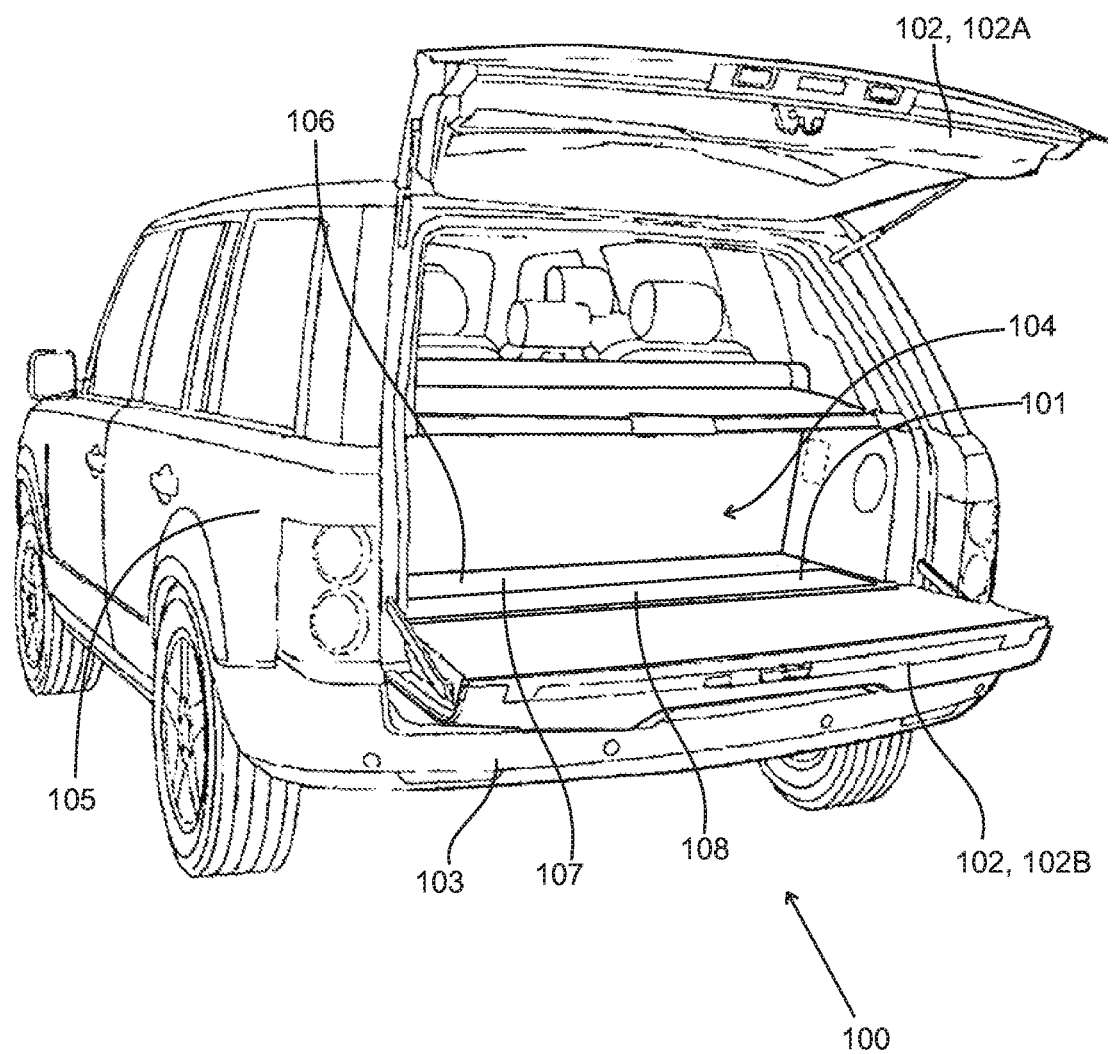
FIG. 1 shows a rear perspective view of a vehicle comprising apparatus embodying the present invention in a stowed configuration.
Figure 2:
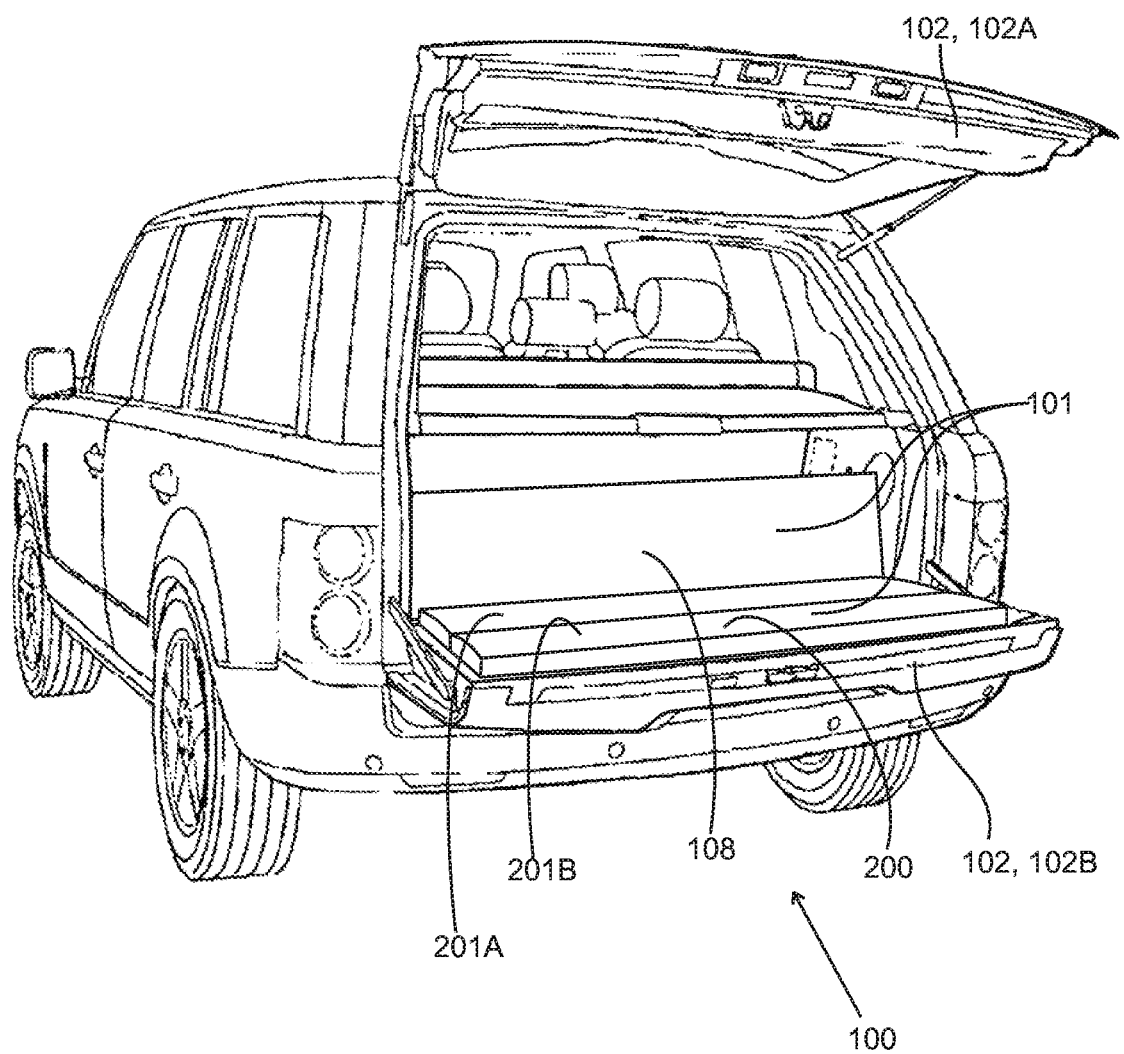
FIG. 2 shows a rear perspective view of the vehicle with the apparatus in a deployed configuration.

A rear perspective view of a vehicle 100 comprising apparatus 101 embodying the present invention is shown in FIGS. 1 and 2. The vehicle 100 has a tailgate 102 at its rear end 103 to provide access to a load space 104. In the present embodiment the tailgate 102 is a split tailgate having an upper tailgate 102A and a lower tailgate 102B. The upper tailgate 102A is attached to the body 105 of the vehicle 100 by hinges (not shown) at an upper edge of the upper tailgate 102A. The lower tailgate 102B is attached to the body 105 by hinges (not shown) at a lower edge of the lower tailgate 102B so that the lower tailgate 102B is pivotable about a lateral axis between a closed position and an open position. In FIGS. 1 and 2 both the upper tailgate 102A and lower tailgate 102B are shown in their open position. As is known, the lower tailgate 102B may provide a user of the vehicle 100 with a temporary sitting area for use while the vehicle 100 is stationary.

The load space 104 has a floor 106 comprising a load floor board 107. As is known, the load floor board 107 may be carpeted on its upper surface.

The apparatus 101 includes a panel 108, which is shown in FIG. 1 in a stowed orientation, in which the panel 108 forms a part of the floor 106 of the loadspace 104. The upper surface of the panel 108 may be carpeted to match the upper surface of the load floor board 107.

In the stowed position of FIG. 1, the panel 108 resides above a container (603 in FIG. 6) that contains a cushion member 200 (shown in FIG. 2). The panel 108 may be moved, as will be described below, to enable the cushion member 200 to be lifted out of the container 603 and deployed on top of the opened lower tailgate 102B. In the present embodiment, the cushion member 200 comprises two portions 201. Each of the first portion 201A and the second portion 201B of the cushion member 200 extends across most of the width of the lower tailgate 102B. The first portion 201A is attached to the second portion 201B such that the second portion 201B is able to pivot with respect to the first portion 201A and enable the cushion member 200 to be folded up into a stowed configuration, as will be described below.

In alternative embodiments, the apparatus 101 may comprise just a single portion 201 or more than two portions 201. Alternatively, or in addition, the apparatus 100 may comprise more than one cushion member 200, so that a cushion member 200 extends across less than half the width of the lower tailgate 102B. One or more similar cushion members 200 may then be deployed from the container to cover other parts of the width of the lower tailgate 102B.

The cushion member 200 is formed of relatively soft and pliable materials, and therefore when it is deployed, as shown in FIG. 2, it provides a user sitting on the lower tailgate 102B with a relatively comfortable area to sit on.

The panel 108 is shown in a deployed orientation in FIG. 2, in which it extends upwards at an angle of between 70 degrees and 90 degrees to horizontal, and typically 80 degrees to horizontal. When the cushion member 200 is in its deployed position, on the lower tailgate as shown in FIG. 2, the panel 108 extends upwards behind the cushion member 200 (as viewed from the rear of the vehicle 100) to provide a backrest for a user sitting upon on the cushion member 200.

Figure 3:
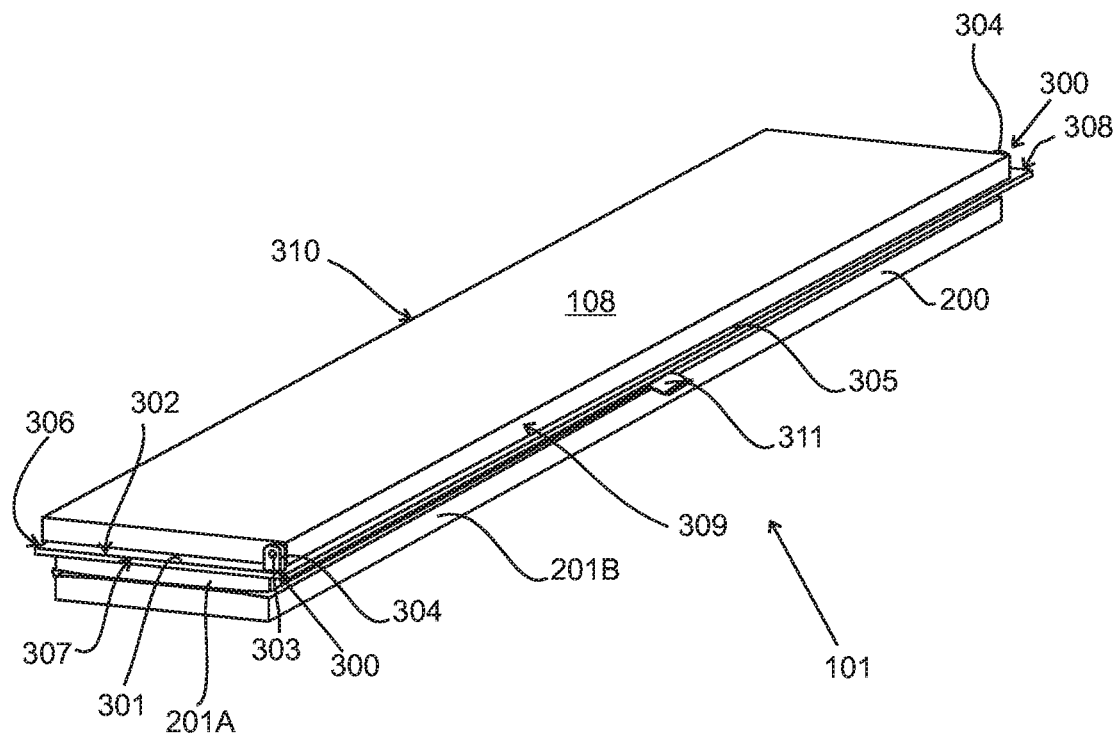
FIG. 3 shows a view of the apparatus in the stowed configuration from the side and above.
Figure 4:
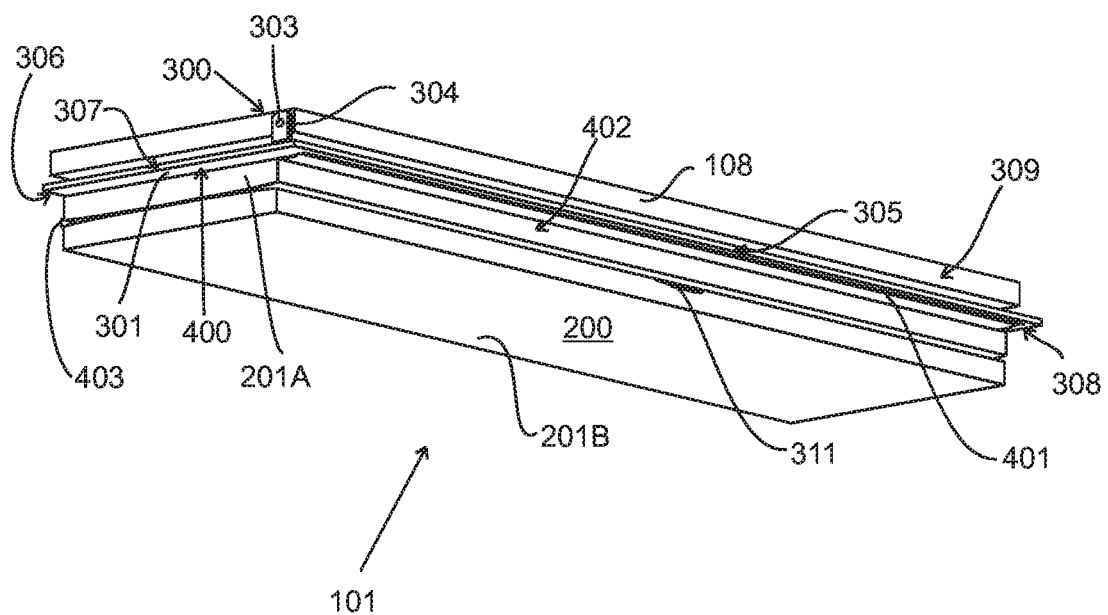
FIG. 4 shows a view of the apparatus in the stowed configuration from the side and below.

Perspective views of the apparatus 101 are shown in FIGS. 3, 4 and 5. In both FIGS. 3 and 4, the panel 108 and the cushion member 200 are shown in their stowed positions. In FIG. 5, the panel is shown in a deployed orientation, while the cushion member 200 is shown partially unfolded. The view of FIG. 3 shows the apparatus 101 from the side and above, while the views of FIGS. 4 and 5 show the apparatus 101 from the side and below.

In the present embodiment the panel 108 is substantially rectangular. The panel 108 is pivotally attached to a lid 301 to enable the panel 108 to pivot between the stowed orientation of FIGS. 3 and 4, in which the panel 108 extends alongside a first face 302 of the lid 301, and a deployed orientation, in which the panel 108 extends at a positive angle to the first face 302 of the lid 301, as shown in FIG. 5. The panel 108 is attached to the lid 301 by a hinge mechanism 300 comprising pivot pins 303 located within brackets 304 that provide bearings for the pivot pins 303. In the present embodiment, the pivot pins 303 are fixed to the panel 108 and the brackets 304, which provide bearings for the pivot pins 303, are fixed to the lid 301. However, in other embodiments, the pivot pins 303 may be fixed to the lid 301 and the panel 108 may comprise bearings in which the pivot pins 303 are arranged to pivot. In the present embodiment, the brackets 304 and pivot pins 303 are positioned at opposite ends of the panel 108. Additionally, or alternatively, brackets 304 and corresponding pivot pins 303 may be positioned part way along the panel 108.

The lid 301 has a similar shape to the panel 108, and therefore in the present embodiment, the first face 302 of the lid 301 has a rectangular shape, having two relatively long sides 305 and 306 and two shorter sides 307 and 308. The first long side 305 of the lid 301 extends alongside a first side face 309 of the panel 108 and the second long side 306 extends alongside a second side face 310 of the panel 108. The panel 108 is attached to the lid 301 so that it is able to pivot with respect to the lid 301 about an axis 501 that extends next to, and parallel to, the first side face 309 of the panel 108.

The cushion member 200 is attached to the lid 301 by a cushion attachment mechanism 401 so that when the cushion member 200 is in its stowed position it resides alongside a second face 400 of the lid 301, opposite to the first face 302 of the lid 301. The cushion attachment mechanism 401 is configured to enable the cushion member 200 to move from the stowed position, shown in FIGS. 3 and 4, to the deployed position shown in FIG. 2 (and FIGS. 8 and 9).

In the present embodiment, the cushion attachment mechanism 401 comprises a pivot arrangement enabling the cushion member 200 to pivot about an axis 502 (shown in FIG. 5) from the stowed orientation in which it extends alongside the second face 400 of the lid 301 to the deployed orientation shown in FIG. 2 (and FIG. 5). The second axis 502 is arranged to be substantially parallel to the first axis 501.

In the present embodiment the cushion attachment mechanism 401 comprises a strip of flexible material having one edge portion fixed to the lid 301 and an opposite edge portion fixed to the cushion member 200. The pivoting of the cushion member 200 with respect to the lid 301 is therefore performed by bending the strip of flexible material forming the cushion attachment mechanism 401. The strip of flexible material providing the cushion attachment mechanism 401 is fixed adjacent to one of the sides 305 of the lid 301, the hinge mechanism 300 is also positioned adjacent to the same side 305 of the lid 301. Thus, the first axis 501 and the second axis 502 are both adjacent to the same side 305 of the lid 301.

In the present embodiment, in which the cushion member 200 comprises two portions 201A and 201B, a first side 402A of the first portion 201A is attached to the lid 301 by the cushion attachment mechanism 401 and a second side 402B of the first portion 201A is attached to the second portion 201B by a folding mechanism 403 arranged to enable the second portion 201B to pivot with respect to the first portion 201A. The folding mechanism 403 may comprise a hinge mechanism. However, in the present embodiment the folding mechanism 403 comprises a live hinge in the form of a strip of flexible material having a first edge attached to the first portion 201A and a second edge attached to the second portion 201B. The strip of flexible material forming the folding mechanism 403 may comprise material forming an outer layer of the cushion portions 201. For example, a continuous sheet of material may form a first face 503 of the first portion 201A and a first face 504 of the second portion 201B, as well as the strip of flexible material that enables the folding of the cushion member 200.

A handle 311 may be provided on the cushion member 200 to enable it to be pulled from the stowed position to the deployed position. In the present embodiment, the handle 311 is fixed to the second portion 201B of the cushion member 200.

Deployment of the cushion member 200 and the panel 108 is illustrated in FIGS. 6, 7, 8 and 9, which show cross-sectional side views of the apparatus 101, the load floor board 107, the lower tailgate 102B and a container 603. The container 603 may be in the form of an open-top box having a rectangular floor 604 and side walls 605 extending upwards from each side of the floor 604. The container 603 is positioned below the floor 106 of the loadspace 104, for example adjacent to a spare wheel (not shown) of the vehicle 100.

The cushion member 200 and the panel 108 are shown in their stowed positions in FIG. 6. The upper surface 601 of the panel 108 extends in substantially the same plane as the upper surface 602 of the load floor board 107 to provide a substantially continuous floor 106 for the load space 104.

In the stowed position, shown in FIG. 6, the cushion member 200 is folded about the folding mechanism 403 with the first face 503 of the first portion 201A facing the first face 504 of the second portion 201B, and the two portions 201A and 201B are positioned within the container 603.

In its orientation shown in FIG. 6, the lid 301 extends over the open top of the container 603. However, the lid 301 is mounted on one or more hinges 606 so that it may be pivoted upwards about an axis adjacent to the side 306 of the lid 301 to enable access to the container 603. In the present embodiment, the lid 301 is mounted on hinges 606 attached to the load floor board 107, but in alternative embodiments the lid 301 may be hingedly attached to another supporting structure in a vehicle. The lid 301, or as shown in FIG. 6 the panel 108, may be provided with a handle 607 to facilitate lifting of the lid 301 away from the container 603. The handle 607 may be for example a strap or tab attached to the panel 108.

The lid 301 is shown in a raised orientation in FIG. 7, for example after being manually lifted by pulling up on the handle 607. It may be noted that the panel 108 continues to reside alongside the upper face 302 of the lid 301, and the first side 402 of the first portion 201A of the cushion member 200 is lifted out from the container 603 because of its attachment to the lid 301. With the lid 301 raised as shown in FIG. 7, it is then possible to lift the second portion 201B of the cushion member 200 out from the container 603, for example by use of the handle 311 attached to the second portion 201B. After lifting the second portion 210 out from the container 603, the second portion may be pulled over the lower tailgate 102B. Due to its attachment to the second portion 201B by the folding mechanism 403, the first portion 201A of the cushion member 200 may be caused to pivot about the cushion attachment mechanism 401 and pulled over the lower tailgate 102B by the same action. The lid 301 may then be lowered back to its original position, over the container 603.

The cushion member 200 is shown in its deployed position, in FIG. 8, in which the cushion member 200 extends away from the lid 301 in a substantially parallel plane to the second face 400 of the lid 301. The first faces 503 and 504 of the two portions 201A and 201B of the cushion member 200 both face upwards away from the lower tailgate 102B, while opposite faces 801 and 802 of the two portions 201 rest on the lower tailgate 102B. The lower tailgate 102B in combination with the cushion member 200 provides a cushioned seat area upon which a user of the vehicle 100 may sit.

The panel 108 may then be moved from its stowed position, in which it extends alongside the first face 302 of the lid 301, to a raised position that is shown in FIG. 9, in which the panel 108 extends at a positive angle to the first face 302 of the lid 301 and provides a backrest for a user sitting on the cushion member 200. This is achieved by pivoting the panel 108 upwards about the hinge mechanism 300. A retaining mechanism 901 (illustrated schematically as block 901 in FIG. 9) is provided for maintaining the panel at the positive angle to the first face. The retaining mechanism 901 may comprise a releasable latching mechanism fixed to side walls of the loadspace 105 which latch against the panel 108 in its deployed orientation. Alternatively, the retaining mechanism 901 may form a part of the apparatus 101. For example, as described below, the retaining mechanism 901 may comprise struts (such as struts 1404 in FIG. 15) that extend between the panel 108 and the lid 301.

To return the panel 108 to the stowed position, the retaining mechanism 901 is disengaged and the panel 108 pivoted back down. The cushion member 200 may then be returned to its stowed position. This may be achieved by lifting the lid 301 as shown in FIG. 7. The action of lifting the lid 301 pulls the cushion member 200 back towards the container 603 and begins folding the cushion member 200 at folding mechanism 403. When the lid 301 is opened sufficiently, the second portion 201B of the cushion member 200 is able to drop back into the container 603. The lid 301 is then closed, and this action completes the folding of the cushion member 200 and its relocation in the container 603.

Figure 10:
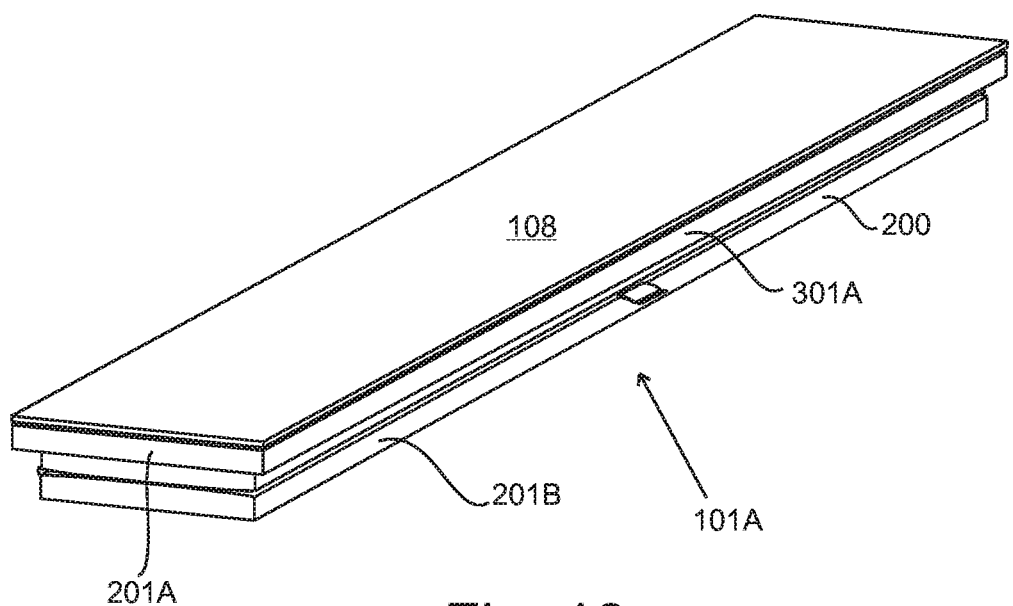
FIG. 10 shows a view from the side and above of another apparatus embodying the invention in a stowed configuration.
Figure 11:
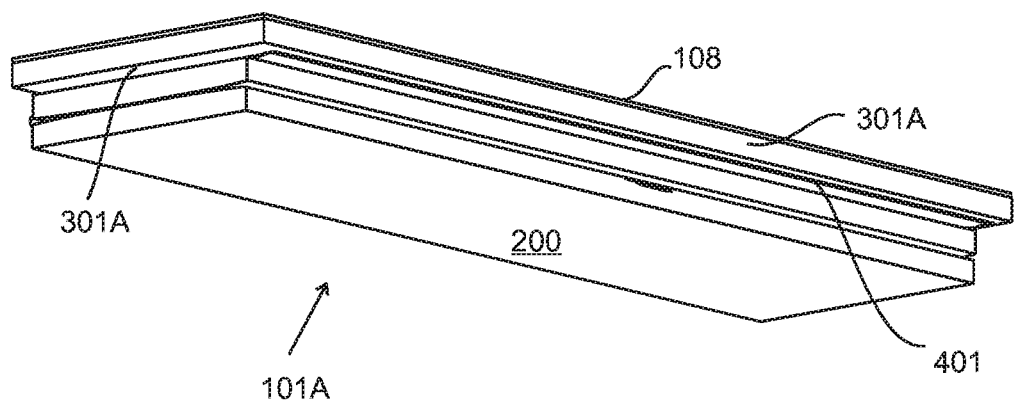
FIG. 11 shows a view from the side and below of the apparatus of FIG. 10.

A perspective view of an alternative apparatus 101A embodying the present invention is shown in FIGS. 10 and 11. The apparatus 101A may be used in the vehicle 100, in place of the apparatus 101. The apparatus 101A comprises many of the features of apparatus 100. Thus, it has a lid 301A for covering an opening of a container 603 and a panel 108A pivotally attached to the lid 301A to enable the panel 108A to pivot between a stowed orientation, in which the panel 108A extends alongside the first face 302 (shown in FIGS. 12 and 13) of the lid 301A, and a first deployed orientation, in which the panel 108A extends at a positive angle to the first face 302 of the lid 301A. The apparatus 101A also comprises a cushion member 200 and a cushion attachment mechanism 401 attaching the cushion member to the lid, which are like those of apparatus 101 and therefore will not be further described below.

The apparatus 101A differs from apparatus 101 in that it has a lid 301A in the form of a tray. The structure of the lid 301A may be most clearly seen in FIGS. 12 and 13, which show a cross-sectional side view and cross-sectional front view of the apparatus 101A with the panel 108A in the stowed position. FIG. 13 also includes an enlarged view of an end portion of the apparatus 101A. The lid 301A has a base 1200 which has a first face 302 facing towards the panel 108A and a second face 400 facing in the opposite direction.

The first face 302 of the base 1200 is rectangular, and a side wall 1200 extends upwards from each of the four sides of the first face 302. Thus, a first side wall 1201A extends upwards from a first one of the longest sides of the base 1200 and a second side wall 1201B extends upwards from the opposite side of the base 1200 as shown in FIG. 12. Similarly a third side wall 1201C extends upwards from a first one of the shortest sides of the base 1200 and a fourth side wall 1201D extends upwards from the opposite side of the base 1200 as shown in FIG. 13. In use the first side wall 1201A is positioned transversely across the loadspace 104 and nearest to the rear end 103 of the vehicle 100.

As shown in FIG. 13, the panel 108A has a central portion 1300 that has a first thickness 1301, most of which is disposed within the depth of the tray-shape of the lid 301A, when the panel 108A is in its stowed position. Edge portions 1302 of the panel 108A, along the shorter sides of the panel 108A, have a thinner profile in order to enable the hinge mechanism 300 (shown in FIG. 14) and the retaining mechanism 901 to be accommodated within the lid 310A. The hinge mechanism 300 is configured to pivotally connect the panel 108A to the lid 301A and the retaining mechanism 901 is configured to maintain the panel 108A at a positive angle to the lid 301A when it is in a deployed orientation for use as a backrest. The hinge mechanism 300 and the retaining mechanism 901 provided at each end of the panel 108A are similar in construction, and therefore the hinge mechanism 300 and the retaining mechanism 901 at one end of the panel 108A will be described below.

Figure 14:
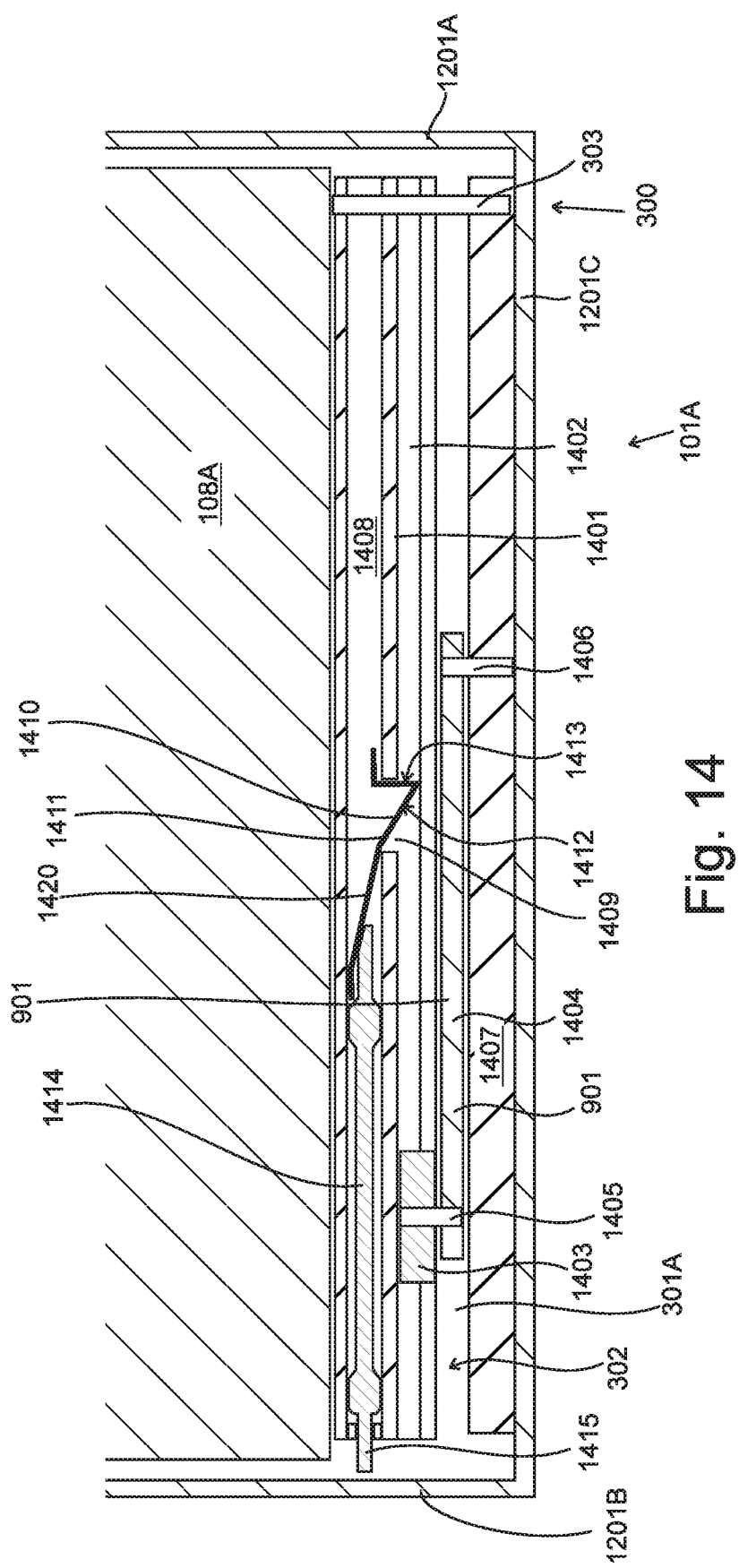
FIG. 14 shows a cross-section through an end portion of the apparatus of FIG. 10, through its panel in a plane parallel to a first face of its lid.

A cross-section through an end portion of the apparatus 101A is shown in FIG. 14. The cross-section is through the panel 108A in a plane parallel to the first face 302 of the lid 301A. A rail member 1401 is attached to the panel 108A alongside the central portion 1300 and the end portion 1302 (shown in the enlarged view of FIG. 13). The rail member 1401 comprises a track 1402 that extends along the length of the rail member 1401 and across the width of the panel 108A. A carriage 1403 is attached to the track 1402 so that it is able to slide along the length of the track 1402 but is retained on the track 1402. In the present embodiment, the track 1402 has a C-shaped cross-section (as shown in FIG. 13) defining a channel along which the carriage 1403 may slide and in which the carriage 1403 is retained. However, it will be appreciated that other track and carriage configurations may be employed in alternative embodiments. For example, a carriage may have a C-shaped cross-section and slide along a track that is enclosed within the C-shaped cross-section of the carriage.

The carriage 1403 is pivotally attached to one end of a strut 1404 by means of a pivot pin 1405. The opposite end of the strut 1404 is pivotally attached to the lid 301A by a second pivot pin 1406. In the present embodiment, the second pivot pin 1406 is retained by a reinforcing member 1407 that forms a part of the lid 301A and extends alongside the side wall 1201C. While the panel 108A is pivoted to its deployed orientation, the carriage 1403 slides along the track 1402 in a first direction (left to right in FIG. 14) while the strut 1404 is caused to extend at oblique angles to the panel 108A and the lid 301A. While the panel 108A is pivoted back to its stowed orientation (shown in FIG. 14), the carriage 1403 slides back along the track 1402 in the opposite direction (right to left in FIG. 14).

The rail member 1401 also comprises an enclosed channel 1408 which extends parallel to a channel formed in the track 1402, and an aperture 1409 extends between the channel of the track 1402 and the enclosed channel 1408 A. A spring portion 1420 of a latching member 1411 is fixed within the enclosed channel 1408 so that a latching portion 1410 of the latching member 1411 extends through the aperture 1409 into the channel of the track 1402.

The latching portion 1410 has a first face 1412 that extends at an oblique angle to the length of the track 1402, so that when the carriage 1403 travels along the track 1401 in the first direction (from left to right in FIG. 14) it is able to ride over the latching portion 1410 by flexing the spring portion 1420 and pushing the latching portion 1410 back through the aperture 1409. Thus, the latching member 1411 does not provide any significant resistance to the panel 108A being deployed.

The latching portion 1410 also has a second face 1413 that extends into the channel of the track 1402 at substantially 90 degrees to the length of the channel Consequently, the latching portion 1410 is able to provide a reactive force to prevent the carriage 1403 from passing in the opposite direction along the track 1402. The arrangement of the strut 1404 and the latching member 1411 therefore provide a retaining mechanism 901 for maintaining the panel 108A in its deployed orientation.

The enclosed channel 1408 also contains an actuator 1414 configured to slide along the enclosed channel 1408. A first end of the actuator 1414 rests against the spring portion 1420 of the latching member 1411 and an opposite second end of the actuator extends out of the enclosed channel 1408 to provide a manually operable button 1415. The spring portion 1420 of the latching member 1411 extends obliquely across the enclosed channel 1408 so that manual pressure applied to the button 1415 at the second end of the actuator 1414 causes the actuator 1414 to press against the latching member 1411, cause the spring portion 1420 to flex and thereby cause the latching portion 1410 to withdraw from the channel of the track 1402. Thus depression of the button 1415 allows the carriage 1403 to travel back along the track 1402 (from right to left in FIG. 14), and thereby allows the panel 108A to be pivoted back to its stowed orientation.

The hinge mechanism 300 comprises a pivot pin 303 fixed to the track 1402 and arranged to pivot within the reinforcing member 1407 of the lid 301A. However, in alternative embodiments, the pivot pin 303 may be fixed in the reinforcing member and mounted in a bearing within the rail member 1401.

In the present embodiment, the rail member 1401 may be formed as an extrusion which defines both the track 1402 and the enclosed channel 1408.

Figure 15:
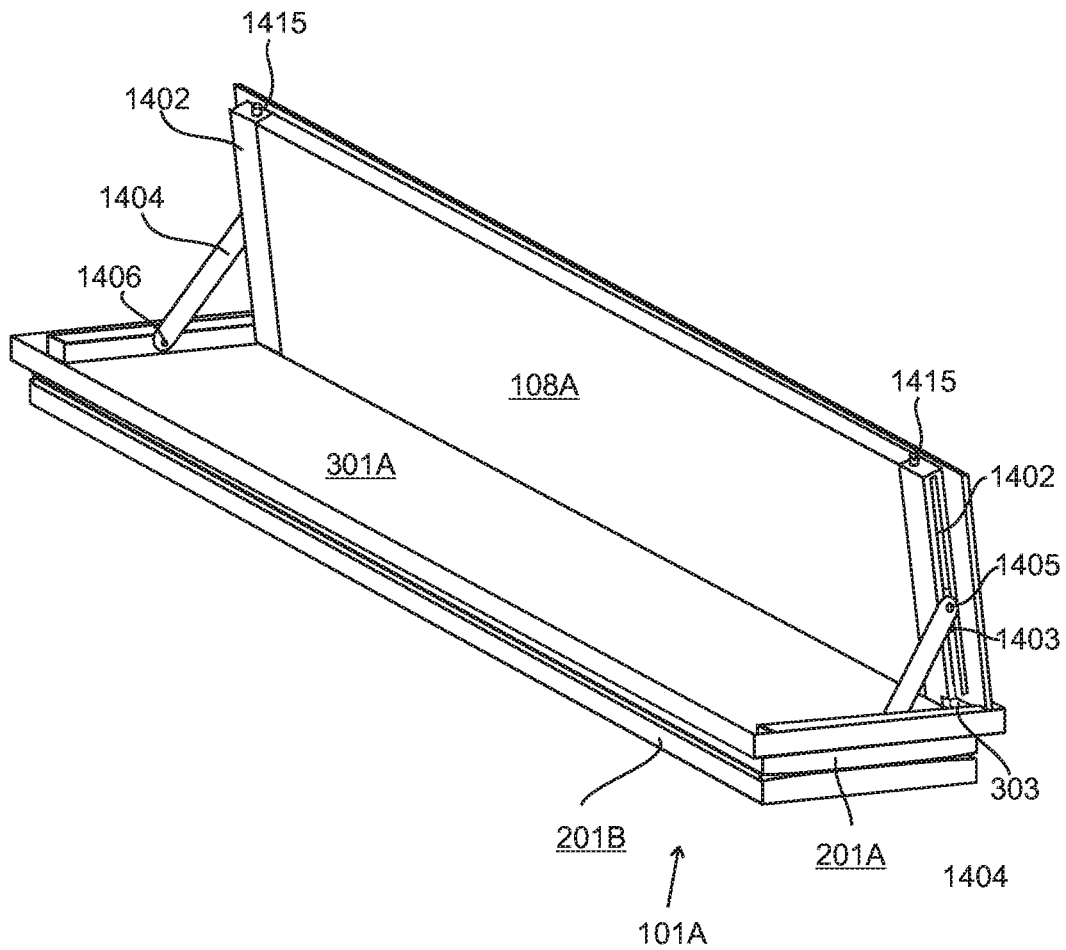
FIG. 15 shows a perspective view of the apparatus of FIG. 10 with the panel in its deployed orientation.

A perspective view of the apparatus 101A with the panel 108A in its deployed orientation is shown in FIG. 15. The panel 108A, the lid 301A and each of the struts 1404 form a triangle with the pivot pins 303, 1405 and 1406 at the three corners. With the carriage 1403, and hence the pivot pins 1405, latched in position by the latching member 1411 (shown in FIG. 14) the struts retain the panel 108A at its deployed angle to the lid 301A.

To return the panel 108A to its stowed position, the buttons 1415 may be depressed to withdraw the latching members 1411 and enable the carriages 1403 to travel along the tracks 1402. It may be noted that the position of the buttons 1415 adjacent to the uppermost side of the panel 108A enables the user to access them with ease.

Figure 16:
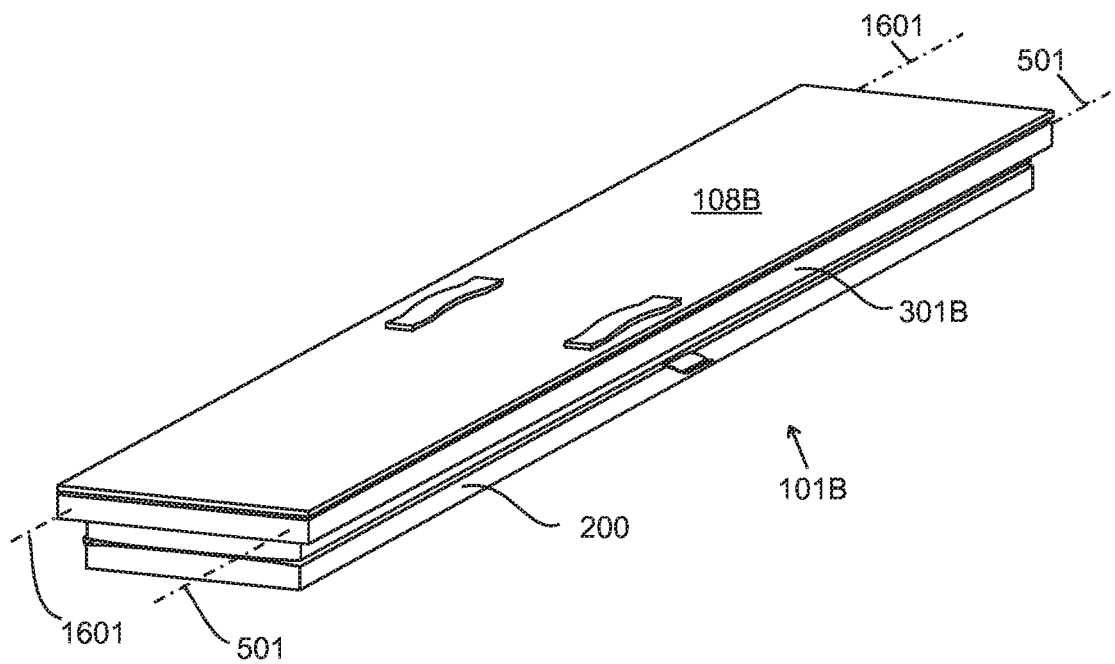
FIGS. 16 and 17 show yet another apparatus embodying the present invention.
Figure 17:
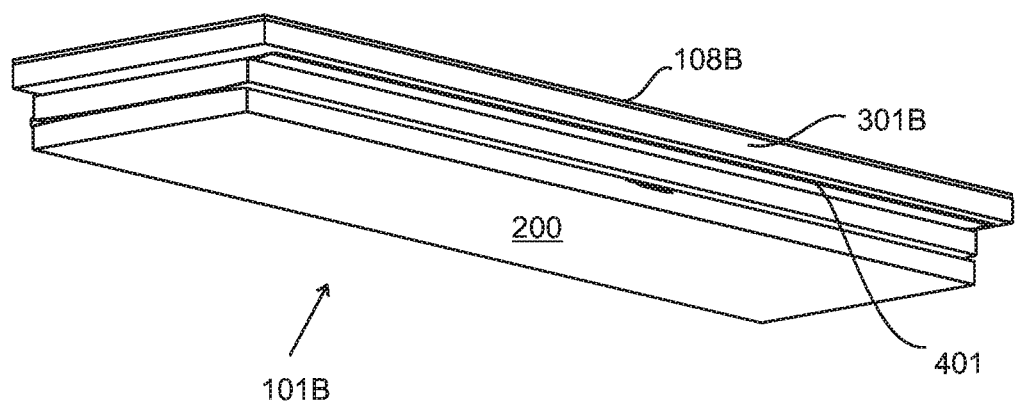

Another apparatus 101B embodying the present invention is shown in the perspective views of FIGS. 16 and 17. The apparatus 101B is similar to apparatus 101A in that it comprises a lid 301B for covering an opening of a container (such as container 603 of FIG. 6) and a panel 108B pivotally attached to the lid 301B. The panel 108B is therefore able to pivot between a stowed orientation (which is illustrated in FIGS. 16 and 17) and a first deployed orientation. In the stowed orientation the panel 108B extends alongside a first face 302 (shown in FIGS. 19 and 20) of the lid 108B and, in use, it provides a portion of the floor 107 of a loadspace 104 as shown for apparatus 101 in FIG. 1. In the first deployed orientation the panel 108B extends at a positive angle to the first face of the lid 301B, so that in use it is able to provide a backrest as shown for apparatus 101 in FIG. 2. The apparatus 101B also comprises a cushion member 200 and a cushion attachment mechanism 401 attaching the cushion member to the lid 301B. The cushion member 200 and the cushion attachment mechanism 401 are like those of apparatus 101 and 101A and therefore they will not be described in any further detail. However, it should be understood that the lid 301B is mountable on hinges in a similar way to the lid 301 of apparatus 101. Also, the apparatus 101B may be used in the same manner as apparatus 101 and as described with reference to FIGS. 1, 2 and 6 to 9.

Apparatus 101B differs from apparatus 101 and apparatus 101A in that the panel 108B is connected to the lid 301B so that it is able to pivot about two different axes with respect to the lid 301B. The panel 108B is pivotally attached to the lid 301B by a first pivot mechanism to enable the panel 108B to pivot about a first axis 501 to the first deployed orientation, as shown in FIG. 2. The apparatus 101B also comprises a second pivot mechanism to enable the panel 108B to pivot with respect to the lid 301B about an alternative pivot axis 1601, instead of the first axis 501, to a second deployed orientation, as shown in FIG. 18.

Figure 18:
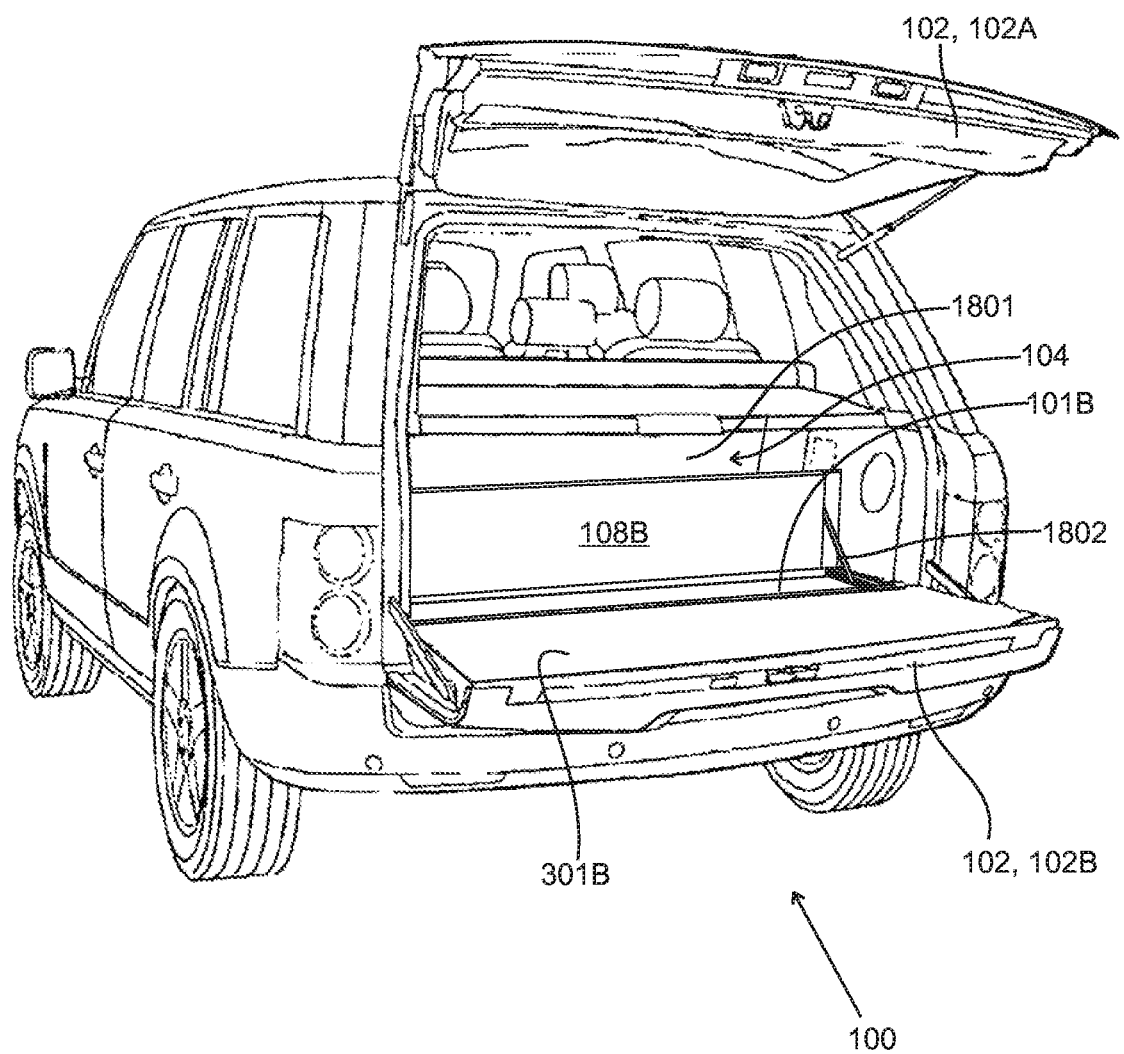
FIG. 18 shows the apparatus of FIG. 16 installed in a vehicle with its panel in a second deployed orientation.

The apparatus 101B is shown installed in a vehicle 100 in FIG. 18, with the panel 108B in the second deployed orientation, in which it extends upwards at an angle of about 90 degrees to the lid 301B. In this second deployed orientation, the panel 108B provides a partition for the loadspace 104. The loadspace 104 is divided by the panel 108B into a first loadspace between the panel 108B and the rear seats 1801 of the vehicle 100, and a second loadspace between the panel 108B and the tailgate 102. The floor of this second loadspace is then provided by the lid 301B.

The apparatus 101B comprises a first retaining mechanism for maintaining the panel 108B in the first deployed orientation in which it provides a backrest as shown in FIG. 2, and a second retaining mechanism for maintaining the panel 108B in the second deployed orientation in which it provides a loadspace partition as shown in FIG. 18. The second retaining mechanism comprises struts 1802 (one of which is shown in FIG. 18) that extend between the panel 108B and lid 301B.

FIGS. 19 and 20 show a cross-sectional side view and cross-sectional front view of the apparatus 101B with the panel 108B in the stowed orientation. FIG. 20A shows an enlarged view of an end portion of the apparatus 101B. The apparatus 101B, like apparatus 101A, has a lid 301B in the form of a tray. The lid 301B has a base 1200 which has a first face 302 facing towards the panel 108B and a second face 400 facing in the opposite direction. The first face 302 of the base 1200 is rectangular, and a side wall 1201 extends upwards from each of the four sides of the first face 302. Thus, a first side wall 1201A extends upwards from a first one of the longest sides of the base 1200 and a second side wall 1201B extends upwards from the opposite side of the base 1200 as shown in FIG. 19. Similarly a third side wall 1201C extends upwards from a first one of the shortest sides of the base 1200 and a fourth side wall 1201D extends upwards from the opposite side of the base 1200 as shown in FIG. 20. In use the first side wall 1201A is positioned transversely across the loadspace 104 and nearest to the rear end 103 of the vehicle 100.

As shown in FIG. 20, the panel 108B has a central portion 2000 that has a first thickness 2001, most of which resides within the height of the side walls 1201 of the lid 301B. Edge portions 1302 of the panel 108B have a thinner profile in order to provide space within the lid 301B to accommodate first and second hinge mechanisms 2103 and 2104 (shown in FIG. 21) and first and second retaining mechanisms 2005 and 2006.

The apparatus 101B in the present embodiment is substantially symmetrical and a similar first hinge mechanism 2103, second hinge mechanism 2104, first retaining mechanism 2005 and second retaining mechanism 2006 are provided at each of the opposing ends of the central portion 1803 of the panel 108B. Therefore, the following description describes the arrangement at one end of the apparatus 101B, but it will be appreciated that the opposite end of the apparatus may be similarly configured.

Figure 21:
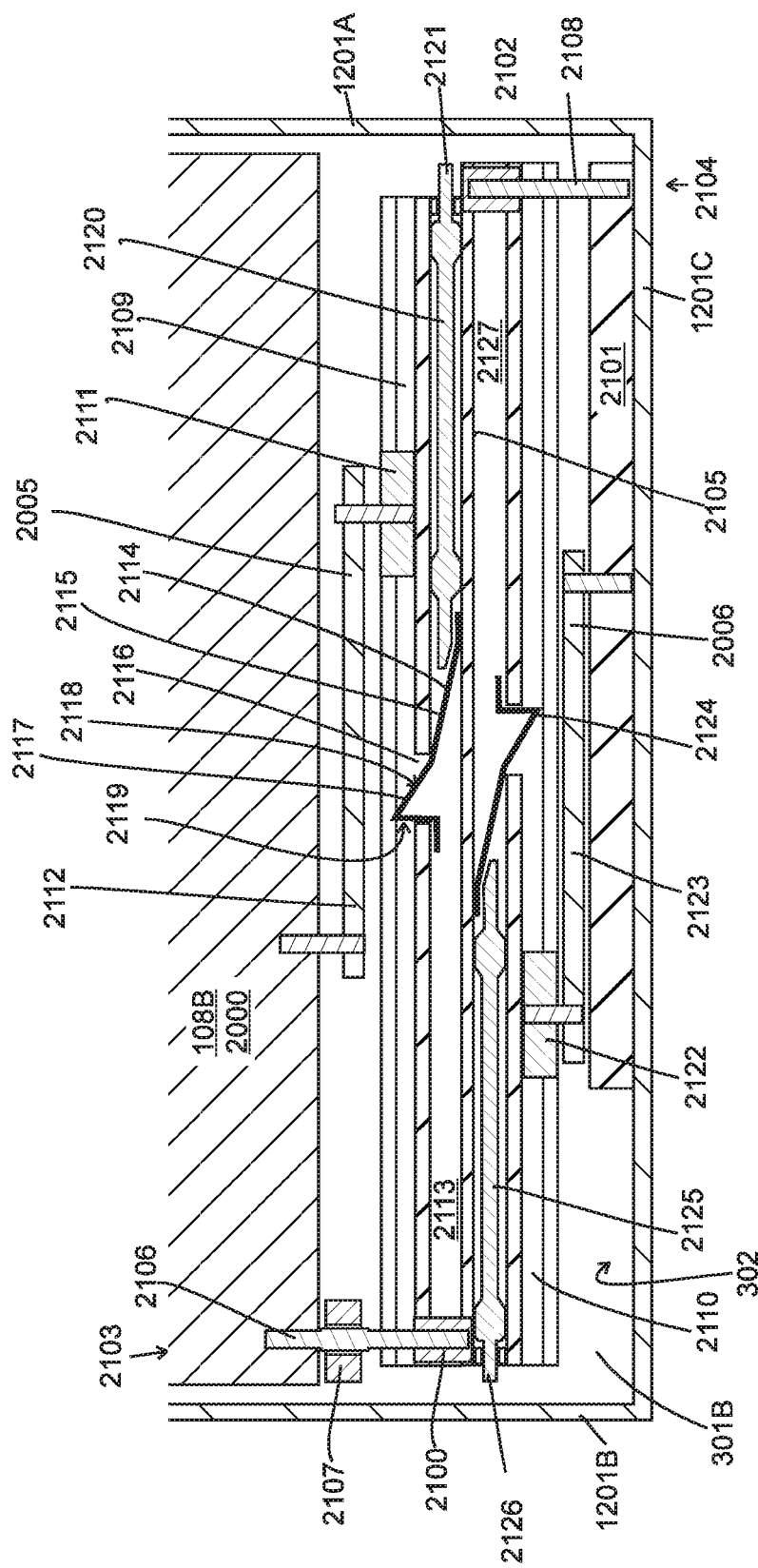
FIG. 21 shows a cross-sectional view of an end portion of the apparatus of FIG. 16 through a plane parallel to the first face of its lid.

A cross-section through an end portion of the apparatus 101B with the panel 108B in its stowed position is shown in FIG. 21. The cross-section is through the panel 108B in a plane parallel to the first face 302 of the lid 301B.

A rail member 2105 extends alongside one end of the central portion 2000 of the panel 108B. In the stowed configuration of FIG. 21, the rail member 2105 extends from a first end of the rail member 2105, adjacent to the side wall 1201B of the lid 301B, to a second end adjacent to the opposite side wall 1201A of the lid 301B. The end of the central portion 2000 of the panel 108B is attached to the first end of the rail member 2105 by the first hinge mechanism 2103, which comprises a pivot pin 2106 fixed to the panel 108B and mounted in a bearing 2100 in the rail member 2105. The pivot pin 2106 pivotally connects the panel 108B to the rail member 2105 and the pivot pin 2106 is also releasably located within a bearing member 2107 that is fixed to the lid 301B.

The second end of the rail member 2105 is pivotally connected to the lid 301B by the second hinge mechanism 2104, which comprises a second pivot pin 2108 that is fixed at one end within a reinforced part 2101 of the lid 301B and located at its other end in a bearing 2102 on the rail member 2105. The rail member 2105 defines a first track 2109 which faces towards the central portion 2000 of the panel 108B and a second track 2110 which faces towards the neighboring side wall 1201C of the lid 301B. Each of the first track 2109 and the second track 2110 may comprise a C-shaped channel similar to the track 1402 of rail member 1401 shown in FIGS. 13 and 14.

The first retaining mechanism 2005 comprises a first carriage 2111 configured to travel along the first track 2109 and a first strut 2112 which has a first end pivotally connected to the first carriage 2111 and a second end pivotally connected to the panel 108B. While the panel 108B is pivoted to its second deployed orientation (as shown in FIG. 18), the first carriage 2111 slides along the first track 2109 in a first direction (right to left in FIG. 21) as the first strut 2112 is caused to extend at oblique angles to the panel 108B and the lid 301B. While the panel 108B is pivoted back to its stowed orientation (shown in FIG. 21), the first carriage 2111 slides back along the first track 2109 in the opposite direction (left to right in FIG. 21).

The first retaining mechanism 2005 also comprises an enclosed channel 2113 which extends parallel to channel formed in the first track 2109. A spring portion 2114 of a first latching member 2115 resides within the enclosed channel 2113. An aperture 2116 extends between the channel of the first track 2109 and the enclosed channel 2113, and a latching portion 2117 of the latching member 2115 extends through the aperture 2116 into the channel of the first track 2109.

The latching portion 2117 has a first face 2118 that extends at an oblique angle to the length of the first track 2109, so that when the first carriage 2111 travels along the track 2109 in the first direction (from right to left in FIG. 21) it is able to ride over the latching portion 2115 by pushing it back through the aperture 2116. Thus, the latching member 2115 does not provide any resistance to the panel 108B being deployed.

The latching portion 2115 also has a second face 2119 that extends into the channel of the first track 2109 at substantially 90 degrees to the length of the channel. Consequently, the latching portion 2115 is able to prevent the first carriage 2111 from passing in the opposite direction along the first track 2109. In this way, the latching member 2115 is able to maintain the panel 108B in its second deployed orientation.

The enclosed channel 2113 also contains an actuator 2120 configured to slide along the enclosed channel 2113. A first end of the actuator 2120 rests against the spring portion 2114 of the latching member 2115 and an opposite second end of the actuator extends out of the enclosed channel 2113 to provide a manually operable button 2121. The spring portion 2114 of the latching member 2115 extends obliquely across the enclosed channel 2113 so that manual pressure applied to the button 2121 at the second end of the actuator 2120 causes the actuator to press against the latching member 2115 and cause the latching portion 2117 to withdraw from the channel of the first track 2109. Thus depression of the button 2121 allows the first carriage 2111 to travel back along the track 2109 (from left to right in FIG. 21) and thereby allows the panel 108B to be pivoted back to its stowed orientation.

The second retaining mechanism 2006 comprises a second carriage 2122, configured to travel along the second track 2110, and a second strut 2123 which has a first end pivotally connected to the second carriage 2122 and a second end pivotally connected to the lid 301B. When the panel 108B is moved to its first deployed orientation (as shown for panel 108 in FIG. 2), the pivot pin 2106 is released from the bearing member 2107 and the panel 108B, together with the rail member 2105, is pivoted about the second hinge mechanism 2104 with respect to the lid 301B. At the same time, the second carriage 2122 is caused to travel along the second track 2110 towards the second pivot pin 2108. The second retaining mechanism 2006 also includes a latching member 2124 configured to prevent a return motion of the second carriage 2122 and thereby holds the second strut 2123 in a position that maintains the panel 108B in the first deployed orientation. The latching member 2124 has a similar configuration to latching member 2115 described above and is located within a second enclosed channel 2127 that extends alongside the second track 2110. The second latching member 2124 is moveable to an unlatched position by a second actuator 2125 located within the second enclosed channel 2127 in a similar manner to the unlatching of the first latching member 2115 as described above. The end of the second actuator 2125 extends out from the end of the second enclosed channel 2127 to provide a manually operable button 2126 adjacent to the first pivot pin 2106.

It may be noted that, when the panel 108B is pivoted to its first deployed orientation, the rail member 2105 is rotated along with the panel 108B about the second hinge mechanism 2104 and therefore when the panel 108B is in its first deployed orientation, the button 2126 is positioned adjacent to the top edge of the panel 108B. It is therefore easily accessible by the user. Also, when the panel 108B is pivoted about the first hinge mechanism 2103 to its second deployed position, the rail member 2105 remains alongside the lid 301B and so the button 2121 is again easily accessible to the user.

Figure 22:
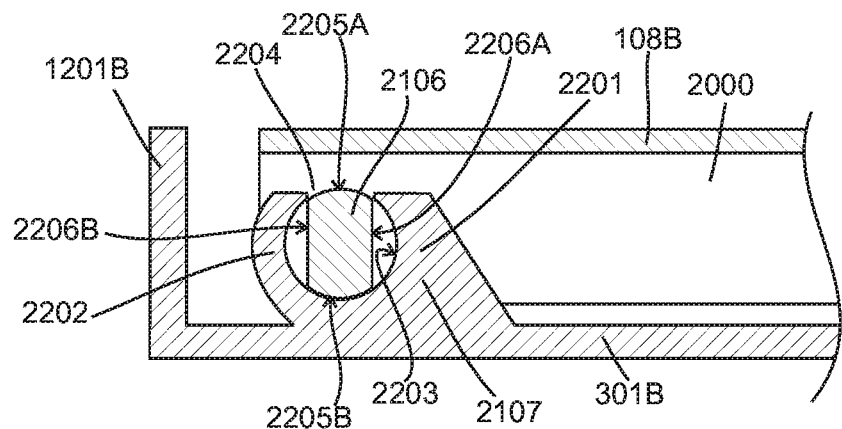
FIG. 22 shows a cross-section of a portion of the apparatus of FIG. 16 including one of its pivot pins located within a bearing member.
Figure 23:
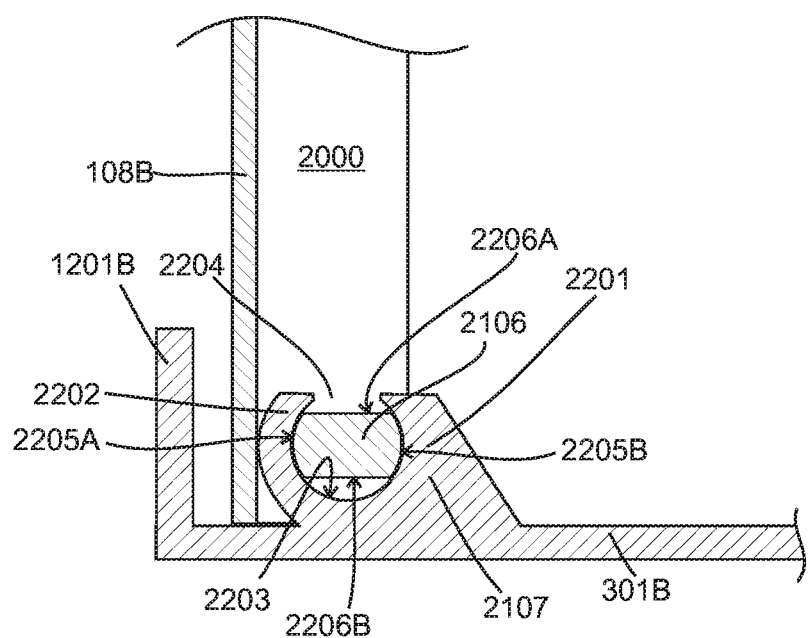
FIG. 23 shows a similar cross-section to FIG. 22 but with the panel of the apparatus in a second deployed orientation.

A cross-section of the pivot pin 2106, the panel 108B and the bearing member 2107 mounted on the lid 301A are shown in FIGS. 22 and 23. The panel 108B is shown in the stowed orientation in FIG. 22 and in the first deployed orientation in FIG. 23.

The bearing member 2107 comprises two arms 2201 and 2202 that extend away from the lid 301B. The arms 2201 and 2202 each define a portion of an inner bearing surface 2203 of the bearing member 2107. The inner bearing surface 2203 extends part-way around a circle but a gap 2204 is provided between the distal ends of the arms 2201 and 2202 providing a gap in the bearing surface 2203. The portion of the pivot pin 2106 that extends through the bearing member 2107 has two outer bearing surfaces 2205A and 2205B that extend part-way around a circle having diameter configured to fit within the inner bearing surface 2203. The two outer bearing surfaces 2205A and 2205B are separated by flat side faces 2206A and 2206B of the pivot pin 2206. The side faces 2206A and 2206B extend at right angles to the lid 301B when the panel 108B is in its stowed orientation as shown in FIG. 22 and the distance between the side faces 2206A and 2206B is designed to enable the pivot pin 2106 to fit through the gap 2204 between the arms 2201 and 2202 of the bearing member 2107. Consequently, when the panel 108B is pivoted about the second pivot pin 2108, to move the panel 108B to its first deployed position, the first pivot pin 2106 is able to be released from the bearing member 2107. However, while the panel 108B is pivoted to its second deployed position, shown in FIG. 23, the pivot pin 2106 is retained within the bearing member 2107 and the outer bearing surfaces 2205A and 2205B of the pivot pin 2106 slide over the inner bearing surface 2203 of the bearing member 2107.

Although embodiments of the present invention have been described in the preceding paragraphs with reference to various examples, it should be appreciated that modifications to the examples given can be made without departing from the scope of the invention as claimed. For example, it will be appreciated that the apparatus may be used to provide a cushioned area with a backrest on the floor of the loadspace of a vehicle that does not have a split tailgate such that a user of the vehicle may comfortably sit, provided the vehicle has space below its floor level to accommodate the apparatus, particularly when the cushion member is in its stowed position.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. Apparatus for a vehicle comprising:
   a lid for covering an opening of a container, the lid having a first face facing in a first direction and a second face facing in a second direction opposite to the first direction;
   a panel pivotally attached to the lid to enable the panel to pivot between a stowed orientation, in which the panel extends alongside the first face of the lid, and a first deployed orientation, in which the panel extends at a positive angle to the first face of the lid;
   a cushion member; and
   a cushion attachment mechanism attaching the cushion member to the lid, wherein the cushion attachment mechanism is arranged to enable the cushion member to move between a stowed position and a deployed position and the cushion attachment mechanism is arranged to enable the cushion member to move between the stowed position in which the cushion member resides alongside the second face of the lid and the deployed position in which the cushion member extends away from the lid substantially parallel to the second face.

2. Apparatus according to claim 1, wherein the panel is arranged to pivot about a first axis relative to the lid, the cushion attachment mechanism is arranged to enable the cushion member to pivot about a second axis relative to the lid, and the second axis is parallel to the first axis.

3. Apparatus according to claim 1, wherein the lid comprises a tray having a side wall along a first side and along a second side thereof; and the panel resides at least partially within the tray in the stowed orientation.

4. Apparatus according to claim 1, wherein the cushion member comprises a first portion attached to the lid by the cushion attachment mechanism and a second portion attached to the first portion by a folding mechanism, the folding mechanism being arranged to enable the second portion to pivot with respect to the first portion.

5. Apparatus according to claim 4, wherein the folding mechanism enables the second portion to pivot between a folded configuration in which a face of the second portion rests against a face of the first portion and an unfolded configuration in which the first portion and the second portion are able to rest against a supporting surface with said face of the second portion and said face of the first portion facing away from the supporting surface.

6. Apparatus according to claim 4, wherein the folding mechanism comprises flexible material configured to flex to enable the second portion to pivot with respect to the first portion.

7. Apparatus according to claim 1, comprising a retaining mechanism for maintaining the panel at the positive angle to the first face.

8. Apparatus according to claim 7, wherein the retaining mechanism comprises at least one of:
   a latch moveable between a latched position, in which the retaining mechanism is arranged to maintain the positive angle between the panel and the first face of the lid, and an unlatched position, in which the retaining mechanism allows the panel to be moved to the stowed orientation; and
   a strut having a first end pivotally attached to a carriage arranged to slide along a track; a second end of the strut being pivotally attached to a first one of the panel and the lid, the track being attached to a second one of the panel and the lid.

9. Apparatus according to claim 8, wherein in the latched position the latch is configured to provide a reactive force to the carriage to prevent movement of the carriage.

10. Apparatus according to claim 1, comprising a first pivot mechanism and a second pivot mechanism and wherein
the panel is pivotally attached to the lid by the first pivot mechanism to enable the panel to pivot about a first axis to the first deployed orientation; and
the second pivot mechanism enables the panel to pivot with respect to the lid about an alternative pivot axis, instead of the first axis, to a second deployed orientation.

11. Apparatus according to claim 10, wherein the apparatus comprises a second retaining mechanism configured to retain the panel in the second deployed orientation.

12. Apparatus according to claim 11, wherein the second retaining mechanism comprises at least one of:
a second latch moveable between a second latched position, in which the second retaining mechanism is arranged to retain the panel in the second deployed orientation, and a second unlatched position, in which the second retaining mechanism allows the panel to be moved to the stowed orientation; and
a second strut having a first end pivotally attached to a second carriage arranged to slide along a second track, a second end of the second strut being pivotally attached to a first one of the panel and the lid, the second track being attached to the other one of the panel and the lid.

13. Apparatus according to claim 1, comprising a hinge mechanism attached to the lid, the hinge mechanism being configured to enable the lid to be pivoted about the hinge mechanism.

14. Apparatus according to claim 13, wherein
the first face of the lid has a first side and a second side opposite to the first side;
the panel is arranged to pivot relative to the lid about a first axis adjacent to said first side; and
the hinge mechanism is configured to enable the lid to pivot about a hinge axis adjacent to said second side.

15. Apparatus according to claim 13, wherein the stowed position of the cushion member is within the container and the deployed position is outside of the container.

16. Apparatus according to claim 1, wherein the cushion attachment mechanism comprises flexible material configured to flex to enable the cushion member to pivot between the stowed position and the deployed position.

17. A vehicle comprising the apparatus of claim 1.

18. A vehicle according to claim 17, wherein in the stowed orientation the panel forms a floor panel within a loadspace of the vehicle, wherein the vehicle has a split tailgate enabling access to the loadspace, wherein the split tailgate has a lower portion pivotable about a laterally extending axis, and wherein in the deployed position the cushion member extends over the lower portion.

19. A vehicle according to claim 17, wherein in the first deployed orientation the panel provides a backrest for a person.

20. Apparatus for a vehicle comprising:
a lid for covering an opening of a container, the lid having a first face facing in a first direction;
a panel pivotally attached to the lid to enable the panel to pivot between a stowed orientation, in which the panel extends alongside the first face of the lid, and a first deployed orientation, in which the panel extends at a positive angle to the first face of the lid;
a cushion member;
a cushion attachment mechanism attaching the cushion member to the lid, wherein the cushion attachment mechanism is arranged to enable the cushion member to move between a stowed position and a deployed position;
a first pivot mechanism; and
a second pivot mechanism,
wherein the panel is pivotally attached to the lid by the first pivot mechanism to enable the panel to pivot about a first axis to the first deployed orientation and the second pivot mechanism enables the panel to pivot with respect to the lid about an alternative pivot axis, instead of the first axis, to a second deployed orientation.

* * * * *